(12) United States Patent  
Jain et al.

(10) Patent No.: US 9,063,738 B2  
(45) Date of Patent: Jun. 23, 2015

(54) DYNAMICALLY PLACING COMPUTING JOBS

(75) Inventors: Navendu Jain, Bellevue, WA (US); Niv Buchbinder, Hod-Hasharon (IL); Ishai Menache, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 12/951,977

(22) Filed: Nov. 22, 2010

(65) Prior Publication Data

US 2012/0130554 A1   May 24, 2012

(51) Int. Cl.  
*G06F 15/173* (2006.01)  
*G06F 1/32* (2006.01)  
*G06F 9/50* (2006.01)

(52) U.S. Cl.  
CPC .............. *G06F 1/329* (2013.01); *G06F 9/5027* (2013.01); *G06F 9/5094* (2013.01); *Y02B 60/142* (2013.01); *Y02B 60/144* (2013.01)

(58) Field of Classification Search  
USPC .................................. 709/223, 224, 229, 226  
See application file for complete search history.

(56) References Cited

U.S. PATENT DOCUMENTS

| | | | |
|---|---|---|---|
| 5,576,700 A | 11/1996 | Davis et al. | |
| 6,263,315 B1 | 7/2001 | Talluri | |
| 6,452,289 B1 | 9/2002 | Lansberry et al. | |
| 6,795,928 B2 | 9/2004 | Bradley et al. | |
| 6,868,682 B2 | 3/2005 | Sharma et al. | |
| 7,110,913 B2 | 9/2006 | Monroe et al. | |
| 7,111,061 B2 | 9/2006 | Leighton et al. | |
| 7,127,625 B2 | 10/2006 | Farkas et al. | |
| 7,135,956 B2 | 11/2006 | Bartone et al. | |
| 7,136,830 B1 | 11/2006 | Kuelbs et al. | |
| 7,272,735 B2 | 9/2007 | Fung | |
| 7,318,154 B2 | 1/2008 | Tehee | |
| 7,321,221 B2 | 1/2008 | Bucker et al. | |
| 7,350,186 B2 | 3/2008 | Coleman et al. | |
| 7,365,973 B2 | 4/2008 | Rasmussen et al. | |
| 7,373,268 B1 | 5/2008 | Viredaz et al. | |
| 7,379,884 B2 | 5/2008 | Barsness et al. | |
| 7,437,730 B2 | 10/2008 | Goyal | |
| 7,484,111 B2 | 1/2009 | Fung | |
| 7,500,001 B2 | 3/2009 | Tameshige et al. | |
| 7,525,207 B2 | 4/2009 | Clidaras et al. | |
| 7,551,130 B2 | 6/2009 | Altenschulte | |

(Continued)

FOREIGN PATENT DOCUMENTS

| CN | 100458605 C | 2/2009 |
|---|---|---|
| CN | 101430596 A | 5/2009 |

(Continued)

OTHER PUBLICATIONS

Jiang, et al., "Enabling Autonomic Power-Aware Management of Instrumented Data Centers", Retrieved at<<http://ieeexplore.ieee.org/stamp/stamp.jsp?arnumber=05160976, 2009, pp. 8.

(Continued)

*Primary Examiner* — Lan-Dai T Truong  
(74) *Attorney, Agent, or Firm* — Heikki Einola; Judy Yee; Micky Minhas

(57) ABSTRACT

This document describes techniques for dynamically placing computing jobs. These techniques enable reduced financial and/or energy costs to perform computing jobs at data centers.

20 Claims, 6 Drawing Sheets

(56) References Cited

U.S. PATENT DOCUMENTS

| | | |
|---|---|---|
| 7,552,350 B2 | 6/2009 | Fung |
| 7,560,823 B2 | 7/2009 | Schellings |
| 7,568,360 B1 | 8/2009 | Bash et al. |
| 7,604,535 B2 | 10/2009 | Germagian et al. |
| 7,606,719 B2 | 10/2009 | Barsness et al. |
| 7,608,937 B1 | 10/2009 | Altenschulte |
| 7,711,587 B2 | 5/2010 | De Marcken |
| 7,752,858 B2 | 7/2010 | Johnson et al. |
| 7,797,563 B1 | 9/2010 | Moll et al. |
| 7,820,321 B2 | 10/2010 | Horne et al. |
| 7,881,057 B2 | 2/2011 | Fink et al. |
| 7,903,407 B2 | 3/2011 | Matsushima et al. |
| 7,923,965 B2 | 4/2011 | Ritter et al. |
| 7,961,463 B2 | 6/2011 | Belady et al. |
| 8,041,967 B2 | 10/2011 | Belady et al. |
| 8,080,898 B2 | 12/2011 | Fukuhara |
| 8,080,900 B2 | 12/2011 | Corhodzic et al. |
| 8,082,454 B2 | 12/2011 | Totten |
| 8,164,897 B2 | 4/2012 | Graybill et al. |
| 8,189,561 B2 * | 5/2012 | Karaoguz et al. ............ 370/351 |
| 8,458,011 B2 | 6/2013 | Al-Dawsari et al. |
| 2002/0004913 A1 | 1/2002 | Fung |
| 2002/0152305 A1 | 10/2002 | Jackson et al. |
| 2003/0079151 A1 | 4/2003 | Bohrer et al. |
| 2003/0101263 A1 | 5/2003 | Bouillet et al. |
| 2003/0115495 A1 | 6/2003 | Rawson, III |
| 2003/0193777 A1 | 10/2003 | Friedrich et al. |
| 2003/0196126 A1 | 10/2003 | Fung |
| 2004/0177057 A1 | 9/2004 | Fairchild et al. |
| 2005/0132051 A1 | 6/2005 | Hill et al. |
| 2005/0190912 A1 | 9/2005 | Hopkins et al. |
| 2005/0193113 A1 | 9/2005 | Kokusho |
| 2005/0241810 A1 | 11/2005 | Malone et al. |
| 2005/0256952 A1 | 11/2005 | Mouhanna et al. |
| 2006/0036878 A1 | 2/2006 | Rothman et al. |
| 2006/0041537 A1 * | 2/2006 | Ahmed ............................ 707/3 |
| 2006/0080213 A1 | 4/2006 | Inoue |
| 2006/0184287 A1 | 8/2006 | Belady et al. |
| 2006/0277109 A1 | 12/2006 | Kerth et al. |
| 2007/0049133 A1 | 3/2007 | Conroy et al. |
| 2007/0097636 A1 | 5/2007 | Johnson et al. |
| 2007/0130341 A1 | 6/2007 | Ma |
| 2007/0136392 A1 | 6/2007 | Oh et al. |
| 2007/0250838 A1 | 10/2007 | Belady et al. |
| 2007/0294408 A1 | 12/2007 | Jackson |
| 2008/0030078 A1 | 2/2008 | Whitted et al. |
| 2008/0049714 A1 * | 2/2008 | Commarford et al. ........ 370/350 |
| 2008/0072090 A1 | 3/2008 | O'Connor et al. |
| 2008/0141048 A1 | 6/2008 | Palmer et al. |
| 2008/0201720 A1 | 8/2008 | Betzler et al. |
| 2008/0234873 A1 | 9/2008 | Gorbatov et al. |
| 2008/0255899 A1 | 10/2008 | McConnell et al. |
| 2008/0313101 A1 | 12/2008 | Helander et al. |
| 2008/0316938 A1 | 12/2008 | Shi |
| 2009/0063122 A1 | 3/2009 | Nasle |
| 2009/0106571 A1 | 4/2009 | Low et al. |
| 2009/0119233 A1 | 5/2009 | Dunagan et al. |
| 2009/0215375 A1 | 8/2009 | Hagensen |
| 2009/0228726 A1 | 9/2009 | Malik et al. |
| 2009/0229194 A1 | 9/2009 | Armillas |
| 2009/0248854 A1 | 10/2009 | Conway |
| 2009/0251860 A1 | 10/2009 | Belady et al. |
| 2009/0254660 A1 | 10/2009 | Hanson et al. |
| 2009/0265568 A1 | 10/2009 | Jackson |
| 2009/0265704 A1 * | 10/2009 | Branda et al. ................. 717/176 |
| 2009/0271046 A1 | 10/2009 | Lewis et al. |
| 2009/0276771 A1 | 11/2009 | Nickolov et al. |
| 2009/0279444 A1 | 11/2009 | Ravindran et al. |
| 2009/0281846 A1 | 11/2009 | Rose |
| 2009/0295167 A1 | 12/2009 | Clidaras et al. |
| 2009/0319090 A1 | 12/2009 | Dillon et al. |
| 2010/0003545 A1 | 1/2010 | Horne et al. |
| 2010/0020806 A1 | 1/2010 | Vahdat et al. |
| 2010/0037038 A1 | 2/2010 | Bieswanger et al. |
| 2010/0049616 A1 | 2/2010 | Hipsher |
| 2010/0050172 A1 | 2/2010 | Ferris |
| 2010/0057641 A1 | 3/2010 | Boss et al. |
| 2010/0058350 A1 | 3/2010 | Boss et al. |
| 2010/0061250 A1 | 3/2010 | Nugent et al. |
| 2010/0088150 A1 | 4/2010 | Mazhar et al. |
| 2010/0088205 A1 | 4/2010 | Robertson |
| 2010/0100696 A1 | 4/2010 | Suzuki |
| 2010/0145801 A1 | 6/2010 | Chekuri |
| 2010/0191998 A1 | 7/2010 | Moore |
| 2010/0211669 A1 | 8/2010 | Dalgas et al. |
| 2010/0218186 A1 | 8/2010 | Wolfe et al. |
| 2010/0228819 A1 | 9/2010 | Wei |
| 2010/0235903 A1 | 9/2010 | Carter et al. |
| 2010/0248609 A1 | 9/2010 | Tresh et al. |
| 2010/0250358 A1 | 9/2010 | Elkins, II et al. |
| 2010/0306776 A1 | 12/2010 | Greene |
| 2010/0318454 A1 | 12/2010 | Warncke et al. |
| 2010/0319004 A1 | 12/2010 | Hudson et al. |
| 2010/0332401 A1 | 12/2010 | Prahlad et al. |
| 2010/0333105 A1 | 12/2010 | Horvitz et al. |
| 2010/0333116 A1 | 12/2010 | Prahlad et al. |
| 2011/0016214 A1 | 1/2011 | Jackson |
| 2011/0035072 A1 | 2/2011 | Jackson |
| 2011/0055034 A1 | 3/2011 | Ferris et al. |
| 2011/0099095 A1 | 4/2011 | Moore et al. |
| 2011/0105015 A1 | 5/2011 | Carlson |
| 2011/0131309 A1 | 6/2011 | Akiyama et al. |
| 2011/0138708 A1 | 6/2011 | Chazelle et al. |
| 2011/0161526 A1 | 6/2011 | Ravindran et al. |
| 2011/0205949 A1 * | 8/2011 | Maenpaa et al. .............. 370/311 |
| 2011/0208606 A1 | 8/2011 | Hadar et al. |
| 2011/0231552 A1 | 9/2011 | Carter et al. |
| 2011/0240265 A1 | 10/2011 | Dechene et al. |
| 2011/0278928 A1 | 11/2011 | Burger et al. |
| 2011/0288898 A1 * | 11/2011 | Roe .............................. 705/7.13 |
| 2011/0296019 A1 | 12/2011 | Ferris |
| 2012/0016721 A1 | 1/2012 | Weinman |
| 2012/0030356 A1 * | 2/2012 | Fletcher ........................ 709/226 |
| 2012/0089726 A1 | 4/2012 | Doddavula |
| 2012/0095940 A1 | 4/2012 | Borgs et al. |
| 2012/0109705 A1 | 5/2012 | Belady et al. |
| 2012/0115433 A1 | 5/2012 | Young et al. |
| 2012/0158447 A1 | 6/2012 | Jain et al. |
| 2012/0259760 A1 * | 10/2012 | Sgouridis et al. ............... 705/37 |
| 2012/0290725 A1 | 11/2012 | Podila |
| 2012/0330711 A1 | 12/2012 | Jain et al. |
| 2012/0331113 A1 | 12/2012 | Jain et al. |

FOREIGN PATENT DOCUMENTS

| | | |
|---|---|---|
| CN | 101096942 A | 3/2013 |
| JP | 2003-162591 | 6/2003 |
| JP | 2003-324956 | 11/2003 |
| JP | 2006-508445 A | 3/2006 |
| JP | 2007-249470 | 9/2007 |
| JP | 2007-324956 A | 12/2007 |
| WO | 2004/049157 A2 | 6/2004 |
| WO | 2004/092971 | 10/2004 |

OTHER PUBLICATIONS

Chen, et al., "Energy-Aware Server Provisioning and Load Dispatching for Connection-Intensive Internet Services", Retrieved at <<http://research.microsoft.com/en-us/um/people/zhao/pubs/nsdi08_xiao.pdf, 2008, pp. 14.

Chase, et al., "Managing Energy and Server Resources in Hosting Centers", Retrieved at <<http://cseweb.ucsd.edu/~vandat/papers/muse-sosp01.pdf, 2001, pp. 14.

Perry, Michael, "Australian Greens Propose A$23/ton Carbon Tax", Retrieved at <<http://uk.reuters_com/article/iduktre65s2u920100629>>, Jan. 29, 2010, pp. 2.

Butler, Declan, "France Unveils Carbon Tax", Retrieved at <<http://www.nature.com/news/2009/090911/full/news.2009.905.html>>, Sep. 15, 2009, pp. 4.

"Carbon Tax Center", Retrieved at <<www.carbontax.org>>,Aug. 5, 2010, pp. 7.

(56) References Cited

OTHER PUBLICATIONS

Bansal, et al., "A Primal-Dual Randomized Algorithm for Weighted Paging", Retrieved at <<http://www.cs.technion.ac.il/~nivb/papers/weighted-paging.pdf>>, 2007, pp. 11.
Bansal, et al., "Randomized Competitive Algorithms for Generalized Caching", Retrieved at <<http://research.microsoft.com/en-us/um/people/nivbuchb/papers/web-caching/web-caching.pdf>>, May 17-20, 2008, pp. 10.
Bansal, et al., "Towards the Randomized K-Server Conjecture: A Primal-Dual Approach", Retrieved at <<http://domino.research.ibm.com/comm/research_people.nsf/pages/nikhil.pubs.html/$FILE/extended-primal-dual.pdf>>, 2010, pp. 24.
Bartal, et al., "A Polylog (N)-Competitive Algorithm for Metrical Task Systems", Retrieved at <<http://www.google.co.in/url?sa=t&source=web&cd=5&ved=0CC4QFjAE&url=http%3A%2%2Fciteseerx.ist.psu.edu%2Fviewdoc%2Fdownload%3Fdoi%3D10.1.1.39.3857%26rep%3Drep1%26type%3Dpdf&rct=j&q=A%20polylog(n)-competitive%20algorithm%20for%20metrical%20task%20systems&ei=BIJaTPScOYH_4AbO_-2EAg&usg=AFQjCNEdMbYyyaLhQ01jYc-1VAhdalpAeA>>, 1997, pp. 9.
Belady, Christian, L. "In the Data Center, Power and Cooling Costs More Than it Equipment it Supports", Retrieved at<<http://www.electronics-cooling.com/2007/02/in-the-data-center-power-and-cooling-costs-more-than-the-it-equipment-it-supports/>>, Feb. 1, 2007, pp. 6.
Borodin, et al., "Online Computation and Competitive Analysis", Retrieved at <<http://www.google.co.in/url?sa=t&source=web&cd=5&ved=0CC0QFjAE&url=http%3A%2F%2Fwww.gbv.de%2Fdms%2Fgoettingen%2F236832409.pdf%rct=j&q=Online%20computation%20and%20competitive%20analysis&ei=r4NaTIzROsij4Abe8ITxAQ&usg=AFQjCNEFoECsmmMPoASVdvcymLwjcVO4qg>>, 1998, pp. 6.
Borodin, et al., "An Optimal On-Line Algorithm for Metrical Task System", Retrieved at <<http://www.google.co.in/url?sa=t&source=web&cd=3&ved=0CCMQFjAC&url=http%3A%2F%2Fciteseerx.ist.psu.edu%2Fviewdoc%2Fdownload%3Fdoi%3D10.1.1.74.7160%26rep%3Drep1%26type%3Dpdf&rct=j&q=An%20optimal%20on-line%20algorithm%20for%20metrical%20task%20system&ei=4NaTMuECMrS4galtq3-AQ&usg=AFQjCNFYrRVoLBy9GJ5Cfpc8vF342tpNXg>>, Sep. 1992, pp. 19.
Buchbinder, et al., "The Design of Competitive Online Algorithms Via a Primaldual Approach", Retrieved at<<http://research.microsoft.com/en-us/um/people/nivbuchb/papers/pd-survey.pdf>>, 2007, pp. 174.
Fiat, et al., "Better Algorithms for Unfair Metrical Task Systems and Applications", Retrieved at<<http://citeseerx.ist.psu.edu/viewdoc/download?doi=10.1.1.21.7258&rep=rep1&type=pdf>>, 2000, pp. 20.
Patrick, McGeehan, "Heat Wave Report: 102 Degrees in Central Park", Retrieved at<<http://cityroom.blogs.nytimes.com/2010/07/06/heatwave-report-the-days-first-power-loss/?hp>>,Jul. 6, 2010, pp. 17.
Qureshi, et al., "Cutting the Electric Bill for Internet-Scale Systems", Retreived at<<http://www.google.co.in/url?sa=t&source=web&cd=3&ved=0CB0QFjAC&url=http%3A%2F%2Fciteseerx.ist.psu.edu%2Fviewdoc%2Fdownload%3Fdoi%3D10.1.1.151.9230%26rep%3Drep1%26type%3Dpdf&rct=j&q=Cutting%20the%20electric%20bill%20for%20internet-scale%20systems&ei=TodaTI2GJof34AaAzISaAg&usg=AFQjCNEHK7sGMLG1c-cGU9Ya8_vF_tAW4A>>, Aug. 17-21, 2009, pp. 12.
Sleator, et al., "Amortized Efficiency of List Update and Paging Rules", Retrieved at<<http://www.google.co.in/url?sa=t&source=web&cd=1&ved=0CBUQFjAA&url=http%3A%2F%2Fciteseerx.ist.psu.edu%2Fviewdoc%2Fdownload%3Fdoi%3D10.1.1.90.3388%26rep%3Drep1%26type%3Dpdf&rct=j&q=Amortized%20efficiency%20of%20list%20update%20and%20paging%20rules&ei=IlhaTNvYINTP4gad6MWeAg&usg=AFQjCNHS_H9stkUtfKpRwHtZ6HZLQX-oNg>>, vol. 28, No. 2, Feb. 1985, pp. 202-208.
"Windows Azure Platform", Retrieved at<<http://www.azure.com>>, pp. 2.
Bansal, N. et al.; "Metrical Task Systems and the k-Server Problem on HSTs"; Proceedings of the $37^{th}$ International Colloquium on Automata, Languages and Programming; 2010; 12 pages.
Battles, et al., "Reducing Data Center Power Consumption through Efficient Storage," Network Appliance, Inc., Sunnyvale, CA; WP-7010-0207; Feb. 2007; 9 pages.
Bonvin, N. et al.; "Autonomic SLA-driven Provisioning for Cloud Applications"; $11^{th}$ IEEE/ACM International Symposium on Cluster, Cloud and Grid Computing (CCGrid); May 23-26, 2011; Published online Feb. 2011; 10 pages.
Borenstein, et al.; "Dynamic Pricing, Advanced Metering, and Demand Response in Electricity Markets"; University of California Energy Institute; 2002; 102 pages.
Buchbinder, et al.; "Online Job-Migration for Reducing the Electricity Bill in the Cloud"; Lecture Notes in Computer Science; Networking 2011 Proceedings of the $10^{th}$ International IFIP TC 6 Conference on Networking; vol. 6640, Part I; 2011; pp. 172-185.
Buyya, R. et al.; "Cloudbus Toolkit for Market-Oriented Cloud Computing"; Proceedings of the 1st International Conference on Cloud Computing; Oct. 11, 2009; pp. 24-44.
Cho, et al.; "Strategic Consumer Response to Dynamic Pricing of Perishable Products"; International Series in Operations Research & Management Science; vol. 131; Aug. 2008; pp. 435-458.
Dasu, S. et al.; "Dynamic pricing when consumers are strategic: Analysis of a posted pricing scheme"; European Journal of Operational Research; vol. 204, Issue 3; 2010; pp. 1-23.
Dunn, D.; "Data Center Energy Efficiency Through BCM"; Industry Perspectives; Jan. 2010; 7 pages.
Fan, X. et al.; "Power Provisioning for a Warehouse-sized Computer"; Proceedings of the ACM International Symposium on Computer Architecture; Jun. 2007; 11 pages.
Grossman, R.L.; "The Case for Cloud Computing"; IT Professional; vol. 11, No. 2; Mar. 21, 2009; pp. 23-27.
Harrison, A., "Symantec Energy Efficient Data Center Solutions," Symantec Corporation, Cupertino, CA; Jan. 12, 2008; 15 pages.
Kahn, C.; "As power demand soars, grid holds up . . . so far"; Jul. 7, 2010; Associated Press; 1 page.
Levin, Y. et al.; "Dynamic Pricing in the Presence of Strategic Consumers and Oligopolistic Competition"; Management Science; vol. 55, No. 1; Jan. 2009; pp. 32-46.
Levin, Y. et al.; "Optimal Dynamic Pricing of Perishable Items by a Monopolist Facing Strategic Consumers"; Production and Operations Management; 2009; 53 pages.
Li et al.; "Load Balancing for Multi-tiered Database Systems through Autonomic Placement of Materialized Views"; Proceedings of the 22nd International Conference on Data Engineering (ICDE 2006); 2006; 12 pages.
Pauley, W.A.; "Cloud Provider Transparency: An Empirical Evaluation"; IEEE Security and Privacy; vol. 8, No. 6; Aug. 19, 2010; pp. 32-39.
Pflueger, et al.; "Data Center Efficiency in the Scalable Enterprise"; Dell Power Solutions; Feb. 2007; pp. 8-14.
Popa, R.A. et al.; "Enabling Security in Cloud Storage SLAs with Cloud Proof"; Microsoft Research Technical Report MSR-TR-2010-46; May 2010; pp. 1-12.
Rao, L. et al.; "Minimizing Electricity Cost: Optimization of Distributed Internet Data Centers in a Multi-Electricity-Market Environment"; INFOCOM; 2010; 9 pages.

(56) References Cited

OTHER PUBLICATIONS

Rasmussen, N.; "Implementing Energy Efficient Data Centers"; White Paper #114; American Power Conversion; Retrieved at http://www.apcmedia.com/ salestools/NRAN-6LXSHX_R0_EN.pdf; 2006; pp. 1-15.

Sweeting, A.; "Dynamic Pricing Behavior in Perishable Goods Markets: Evidence from Secondary Markets for Major League Baseball Tickets"; Duke University; Feb. 2010; pp. 1-65.

Timmer, J.; "Renewable Energy and the Future of the Datacenter"; Arstechnica.com business news; May 2008; 2 pages.

Vazirani, V.; "Approximation Algorithms"; Springer; 2001; 396 pages.

Wang, C. et al.; "Markdown Money Contracts for Perishable Goods with Clearance Pricing"; European Journal of Operational Research; vol. 196; 2009; pp. 1113-1122.

Zhang, Q.; "Cloud Computing: State-of-the-Art and Research Challenges"; Journal of Internet Services and Applications; vol. 1 (1); May 2010; Published online Apr. 20, 2010; pp. 7-18.

"About Vibes Interactive"; Vibes Interactive LLC; http://www.vibesinteractive.com/about_us.html; 2010; 2 pages.

"ASG-Workload Optimization Suite for Comprehensive Workload Analysis and Forecasting"; Allen Systems Group, Inc.; 2009; 1 page.

"Consultants: How and Why Pay Per Performance Works (Part 2—Continuation from Last Post)"; Weblog posting published Apr. 4, 2010; http://bizrelationships.wordpress.com/2010/04/19/consultants-how-and-why-pay-per-performance-works-part-2-continuation-from-last-post; 5 pages.

"Data Center Efficiency in the Scalable Enterprise"; reprinted from Dell Power Solutions; Dell Inc.; Feb. 2007; 7 pages.

"Carbon Dioxide Emissions from the Generation of Electric Power in the United States"; http://www.eia.gov/cneaf/electricity/page/co2_report/co2report.html; Jul. 2000.

"Leading the Evolution of the Data Center," Brocade Communications Systems, Inc., San Jose, CA; 2008; 8 pages.

"Managing Energy Efficiency in the Data Center," EMC Corporation, Hopkinton, MA; 2008; 6 pages.

"The Path to a Green Data Center," Hitachi Data Systems and Brocade, Joint Solution Brief; Brocade Communications Systems, Inc., San Jose, CA; 2007; 8 pages.

"PlateSpin Recon"; retrieved on May 11, 2009 at http://www.novell.com/products/recon/consolidation_ratios.html, Novell, Inc.; 2009; 2 pages.

"Sensible Cloud: What is an SLA?"; http://www.sensiblecloud.com/2010/11/what-is-sla/; Retrieved Mar. 24, 2011; 8 pages.

"Tout+Interactive"; Latest Publication Mar. 22, 2011; Earlier weblog entries published on Mar. 19, 2011; Mar. 18, 2011; Mar. 7, 2011; Mar. 6, 2011; and Nov. 29, 2010; http://toutinteractive.com/; 8 pages.

"Zeus Launches Data Center Load Balancing Solution"; retrieved at http://www.continuitycentral.com/news03343.htm, Continuity Central; Jun. 28, 2007; 1 page.

PCT Patent Application PCT/US2011/036364; International Search Report dated Dec. 23, 2011; 8 pages.

CN Notice on the First Office Action for Application No. 201080009556.7, Jul. 29, 2013.

JP Notice of Rejection for Application No. 2011-551110, Jul. 2, 2013.

Chatwin, R.E.; "Optimal Dynamic Pricing of Perishable Products with Stochastic Demand and a Finite Set of Prices"; European Journal of Operational Research 125 (2000); Aug. 1, 1997; pp. 149-174.

PCT Patent Application No. PCT/US2012/042110; International Search Report dated Jan. 31, 2013, pp. 9.

Ardagna, et al., "SLA Based Profit Optimization in Multi-Tier Systems", in Proceedings of the 4th IEEE International Symposium on Network Computing and Applications, Jul. 27-29, 2005, 4 pages.

Beloglazov, et al., "Energy Efficient Resource Management in Virtualized Cloud Data Centers", in Proceedings of the 10th IEEE/ACM International Conference on Cluster, Cloud and Grid Computing, May 17-20, 2010, pp. 826-831.

Bianchini, et al., "Power and Energy Management for Server Systems", IEEE Computer, vol. 37, No. 11, Nov. 2004, 11 pages.

Borgs, et al., "Optimal Mechanisms for Perishable Goods With Variable Supply and Demand", Aug. 11, 2010, 8 pages.

Chaver, et al., "Energy-Aware Fetch Mechanism: Trace Cache and BTB Customization", in Proceedings of the 2005 International Symposium on Low Power Electronics and Design, Aug. 8-10, 2005, 6 pages.

Clark, et al., "Live Migration of Virtual Machines", in Proceedings of the 2nd ACM/USENIX Symposium on Networked Systems Design & Implementation, May 2-4, 2005, 14 pages.

Felter, et al., "A Performance-Conserving Approach for Reducing Peak Power Consumption in Server Systems", in Proceedings of the 19th Annual International Conference on Supercomputing, Jun. 20-22, 2005, 10 pages.

Giannakoudis, et al., "Optimum design and operation under uncertainty of power systems using renewable energy sources and hydrogen storage", International Journal of Hydrogen Energy, ScienceDirect, Available online Nov. 27, 2009, 20 pages.

Gmach, et al., "Capacity Planning and Power Management to Exploit Sustainable Energy", in Proceedings of the 6th International Conference on Network and Service Management, Oct. 25-29, 2010, 8 pages.

Iranli, et al., "System-Level Power Management: An Overview", In The VLSI Handbook Second Edition, CRC Press, Dec. 26, 2006, 22 pages.

Jain, et al., "SLA-Integrated Pricing Models for Cloud Computing", Microsoft Research, Oct. 18, 2010, 5 pages.

Jain, Navendu, "An Optimization Framework for Dynamic Client-Server Partitioning in the IMA Application", Apr. 16, 2010, 3 pages.

Kant, Krishna, "Power Control of High Speed Network Interconnects in Data Centers", IN Proceedings of the 28th IEEE International Conference on Computer Communications, Apr. 19-25, 2009, 6 pages.

Kant, Krishna, "Data center evolution: A tutorial on state of the art, issues, and challenges", Computer Networks, Nov. 12, 2009, 27 pages.

Kant, Krishna, "Distributed Energy Adaptive Computing", IEEE International Conference on Communications, May 23-27, 2010, 5 pages.

Karve, et al., "Dynamic Placement for Clustered Web Applications", in Proceedings of the 15th International World Wide Web Conference, May 22-26, 2006, 10 pages.

Le, et al., "Managing the Cost, Energy Consumption, and Carbon Footprint of Internet Services", SIGMETRICS'10, Jun. 14-18, 2010, 2 pages.

Liu, et al., "GreenCloud: A New Architecture for Green Data Center", in Proceedings of the 6th International Conference on Autonomic Computing and Communications Industry Session, Jun. 16, 2009, 10 pages.

Urgaonkar, et al., "Dynamic Provisioning of Multi-Tier Internet Applications", In Proceedings of the Second International Conference on Autonomic Computing, Jun. 13-16, 2005, 12 pages.

Usenix, "Technical Sessions", 5th Usenix Symposium on Networked Systems Design and Implementation, Apr. 16-18, 2008, 4 pages.

Wang, et al., "Feedback Control Algorithms for Power Management of Servers", in Proceedings of the 3rd International Workshop on Feedback Control Implementation and Design in Computing Systems and Networks, Jun. 6, 2008, 6 pages.

Verma, et al., "Brownmap: Enforcing Power Budget in Shared Data Centers", IBM Research Report, Dec. 17, 2009, 15 pages.

"Solar Chimney", Wikipedia, Published on or before Feb. 27, 2005, 5 pages.

"Solar updraft tower", Wikipedia, Published on or before Aug. 30, 2006, 6 pages.

"PCT International Search Report and Written Opinion for Application No. PCT/US2010/023253", Mailed Date: Sep. 30, 2010, 9 pages.

"Response to First Office Action for Chinese Application No. 201080009556.7", Filed Date: Dec. 4, 2013, 15 pages.

"Second Office Action for Chinese Application No. 201080009556.7", Mailed Date: Feb. 21, 2014, 10 pages.

"Extended European Search Report for European Application No. 10744134.7", Mailed Date: Nov. 14, 2012, 6 pages.

(56) References Cited

OTHER PUBLICATIONS

"Rules 70(2) and 70a(2) EPC Communication for European Application No. 10744134.7", Mailed Date: Dec. 3, 2012, 1 page.
"Response to Rules 70(2) and 70a(2) EPC Communication for European Application No. 10744134.7", Filed Date: Jan. 20, 2013, 15 pages.
"Second Office Action for Japanese Application No. 2011-551110", Mailed Date: Mar. 11, 2014, 11 pages.
"Response to Second Office Action for Japanese Application No. 2011-551110", Filed Date: Jun. 10, 2014, 16 pages.
"Response to Second Office Action for Chinese Application No. 201080009556.7", Filed Date: Apr. 30, 2014, 16 pages.
"Final Office Action for Chinese Application No. 201080009556.7", Filed Date: Jul. 31, 2014, 7 pages.
"European Search Report," From European Patent Application No. 12803686.0, Mailed Date: Oct. 28, 2014, 3 pages.
"Office Action," From European Patent Application No. 12803686.0, Mailed Date: Dec. 1, 2014, 4 pages.
"First Office Action," From Chinese Patent Application No. 201180024779.5, Mailed on Sep. 16, 2014, 12 pages.
"Response to Final Office Action," From Chinese Patent Application No. 201080009556.7, Mailed on Nov. 14, 2014, 12 pages.
"Notice on the Third Office Action," From Chinese Patent Application No. 201080009556.7, Mailed on Dec. 31, 2014, 7 pages.
"Decision on Rexamination," From Chinese Patent Application No. 201080009556.7, Mailed on Dec. 16, 2014, 3 pages.
"Examination Report," From European Patent Application No. 10744134.7, Mailed on Oct. 17, 2014, 7 pages.
"Notice of Allowance," From Japanese Patent Application No. 2011-551110, Mailed on Nov. 11, 2014, 7 pages.
"Response to Third Office Action," From Chinese Patent Application No. 201080009556.7, Filed Date: Mar. 4, 2015, 15 pages.
"Non-final Office Action," From U.S. Appl. No. 12/781,445, Mailed Date: Sep. 23, 2014, 12 pages.
"Response to Office Action," From European Patent Application No. 10744134.7, Filed on Feb. 16, 2015, 11 pages.
"Non-final Office Action," From U.S Appl. No. 12/779,059, Mailed Date: Dec. 5, 2014, 20 pages.
"Amendment," From U.S. Appl. No. 14/464,650, filed Date: Aug. 20, 2014, 8 pages.
"Non-final Office Action," From U.S. Appl. No. 12/973,399, Mailed Date: Jul. 3, 2014, 26 pages.
"Response to Non-final Office Action," From U.S. Appl. No. 13/169,923, filed Feb. 9, 2015, 19 pages.
"Response to Non-final Office Action," From U.S. Appl. No. 13/169,890, filed Feb. 17, 2015, 19 pages.

* cited by examiner

US 9,063,738 B2

DYNAMICALLY PLACING COMPUTING JOBS

BACKGROUND

Modern data centers perform countless computing jobs for businesses and individual users. A modern data center, for example, may enable tens of thousands of individuals to browse the Internet or perform operations using extensive computational resources. To do so, the modern data center includes an infrastructure, such as a building, wiring, air conditioners, and security systems. The modern data center also includes information technology, such as tens or even hundreds of thousands of computer servers, memory, networking, and storage systems. This infrastructure and information technologies are expensive, both in capital and operational expenses.

While these aspects of the modern data center are expensive, energy costs are fast becoming the majority of many data centers' total operational costs. Current solutions attempt to reduce these energy costs by migrating some computing jobs from a data center having high energy costs to a data center having relatively lower energy costs. Unfortunately, these solutions may increase financial costs, unexpectedly increase energy costs, or impede performance.

SUMMARY

This document describes techniques for dynamically placing computing jobs. These techniques enable reduced financial and/or energy costs to perform computing jobs at data centers. These techniques do so by dynamically placing a set of computing jobs at one or more of various data centers based on marginal electricity usage, expected costs for, and availability of, electricity including those for conventionally sourced and renewably-sourced electricity, resource capacity constraints at each data center, or bandwidth costs to transfer state information needed to perform the computing job, to name a few.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference number in different instances in the description and the figures may indicate similar or identical items.

DETAILED DESCRIPTION

Overview

This document describes techniques for dynamically placing a computing job at a data center to reduce overall costs to perform the computing job. Assume, for example, that a business located in Dallas, Tex. needs a computing job requiring extensive computing resources. Assume also that computing jobs for businesses in Dallas are generally performed at a data center in Houston, Tex. because it is relatively close to Dallas, and thus is assumed to have relatively low bandwidth costs compared to other data centers and also data transfer is often the quickest.

These techniques determine a lowest financial cost to perform this job among available data centers, such as data centers located in Houston, Florida, Illinois, Washington D.C., Boston, Los Angeles, San Francisco, and Seattle/Portland. In some conventional job-migration algorithms, the computing job might be sent to Illinois based on it being available and having lower electricity costs than Houston at the time the job is requested. The techniques described herein instead may determine to send the computing job to the Florida data center because, during a particular time-frame in which the computing job is needed, the Florida data center has available low-cost, renewably sourced electricity sufficient to perform the computing job, the bandwidth cost in transferring state information from Houston to Florida is lower than from Houston to Illinois, or Florida's data center has a lower marginal electricity usage to perform the computing job. As will be set forth in greater detail below, numerous factors are balanced by the techniques to provide a lowest overall cost to perform a computing job or multiple computing jobs.

Example Environment

Figure 1:
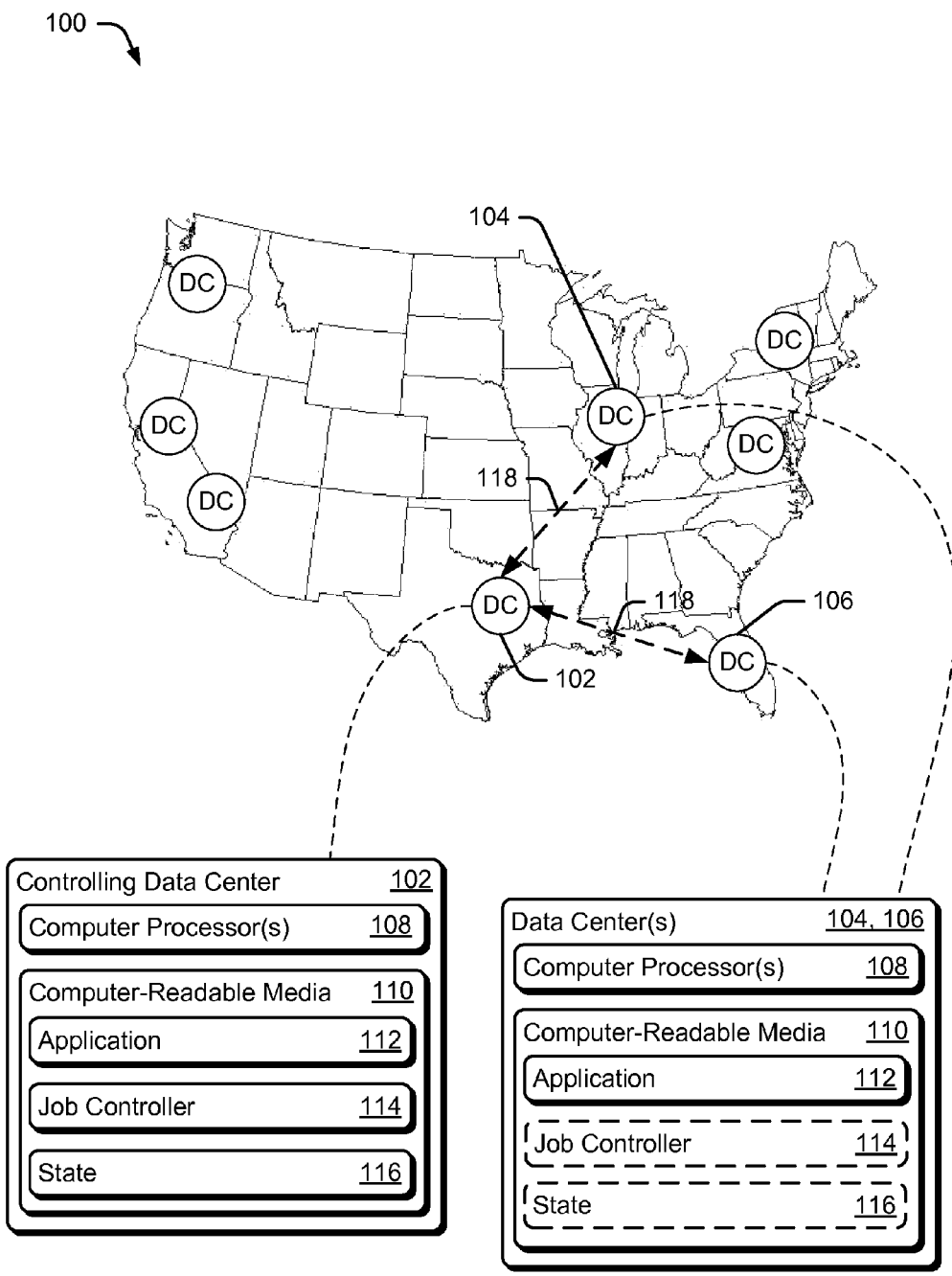
FIG. 1 illustrates an environment in which techniques for dynamically placing computing jobs can be employed.

FIG. 1 is an illustration of an example environment 100 in which techniques for dynamically placing computing jobs can be embodied. Environment 100 includes data centers 102, 104, and 106, as well as other, unmarked data centers. The data centers include computer processor(s) 108 and computer-readable media 110 (as well as infrastructure and other aspects omitted for brevity). Computer-readable media includes an application 112 capable of performing a computing job. One of the data centers either includes, has access to, or receives instructions from a job controller 114.

Job controller 114 dynamically places computing jobs and may operate integral with or separate from a data center. Here job controller 114 is included in computer-readable media 110 and executed by computer processor(s) 108 on data center 102 (called controlling data center 102 due to having job controller 114). Controlling data center 102 is also assumed to be the data center at which the computing job or type thereof has previously been executed or otherwise already includes state 116.

State 116 includes information needed for application 112 to perform the computing job. If a data center includes an out-of-date version of the state or otherwise includes some information but not information sufficient to perform the computing job, it still needs state 116, though generally less information is transferred to that data center than a data center that has no version of the state. This reduced bandwidth is taken into account in some embodiments of the techniques described below. More generally, state 116 can be anywhere from a small amount of information to a very large amount and thus costing a wide range for bandwidth to transfer state 116 to another data center.

Note that data centers 104 and 106 include computer processor(s) 108, computer-readable media 110, and application 112, which may be substantially similar in function to those of data center 102. These data centers 104 and 106 may or may not also have job controller 114 or state 116, depending on the situation.

The illustrated data centers are capable of communicating with each other, such as through the Internet, shown in two cases at 118 with dashed lines between controlling data center 102 and other data centers 104 and 106, respectively. While they may both use the Internet 118 or other communication network(s), bandwidth costs (costs to transfer information) may vary substantially, not only at different data centers at the same time (called a "spatial variation") but also at the same data center at different times (called a "temporal variation").

One or more of the entities shown in FIG. 1 may be further divided, combined, and so on. Thus, environment 100 illustrates some of many possible environments capable of employing the described techniques. Generally, any of the techniques and abilities described herein can be implemented using software, firmware, hardware (e.g., fixed-logic circuitry), manual processing, or a combination of these implementations. The entities of environment 100 generally represent software, firmware, hardware, whole devices or networks, or a combination thereof. In the case of a software implementation, for instance, the entities (e.g., job controller 114, application 112) represent program code that performs specified tasks when executed on a processor (e.g., processor(s) 108). The program code can be stored in one or more computer-readable memory devices, such as computer-readable media 110. The features and techniques described herein are platform-independent, meaning that they may be implemented on a variety of commercial computing platforms having a variety of processors. Ways in which entities of data centers 102, 104, and 106 act are set forth in greater detail below.

Example Processes

The following discussion describes ways in which the techniques may operate to dynamically place a computing job. Aspects of these processes may be implemented in hardware, firmware, software, or a combination thereof. These processes are shown as sets of blocks that specify operations performed, such as through one or more entities or devices, and are not necessarily limited to the order shown for performing the operations by the respective blocks. In portions of the following discussion reference may be made to environment 100 of FIG. 1.

Figure 2:
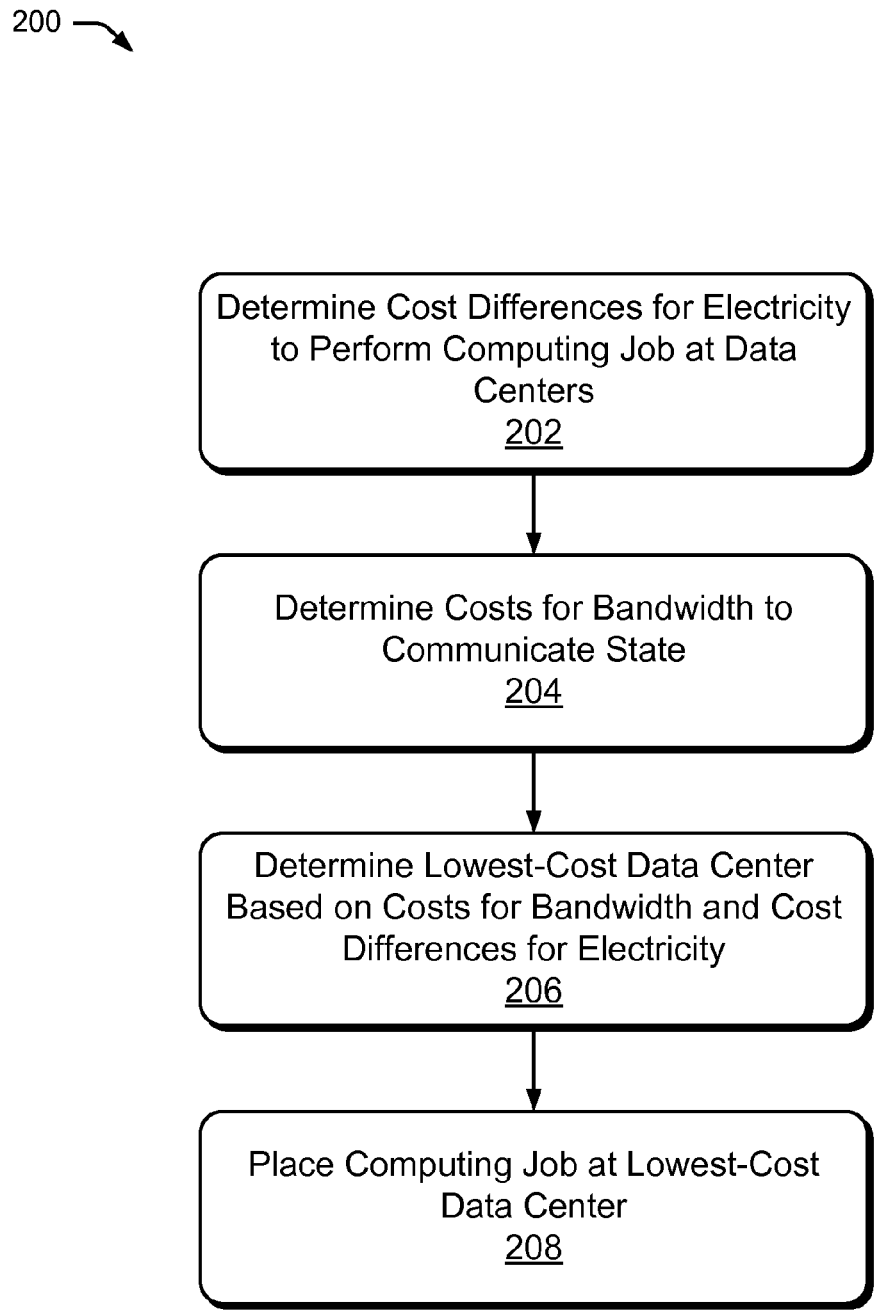
FIG. 2 is a flow diagram depicting an example process for placing a computing job at a lowest-cost data center taking into account electricity and bandwidth costs, though this process may also be used to place a set of computing jobs for a lowest total cost.

FIG. 2 is a flow diagram depicting an example process 200 for placing a computing job at a lowest-cost data center taking into account electricity and bandwidth costs. Process 200 may be repeated effective to place multiple computing jobs of a set of computing jobs for a lowest total cost. Projecting a lowest total cost for a set of computing jobs, however, is covered in greater detail as part of process 500.

Block 202 determines cost differences for electricity needed to perform a computing job at two or more data centers. Process 200 assumes that at least one of the data centers being considered for placement of the computing job does not have current state information needed to perform the computing job (e.g., state 116), though it may or may not have old state information insufficient to perform the job. Process 200 also assumes that the considered data centers are available and able to perform the computing job on receipt of the state.

Block 202 may determine cost differences for many data centers, though preliminarily this analysis may be streamlined by receiving an indication of which data centers are currently available or will be available within a timeframe in which the computing job is scheduled or requested to be performed.

Figure 3:
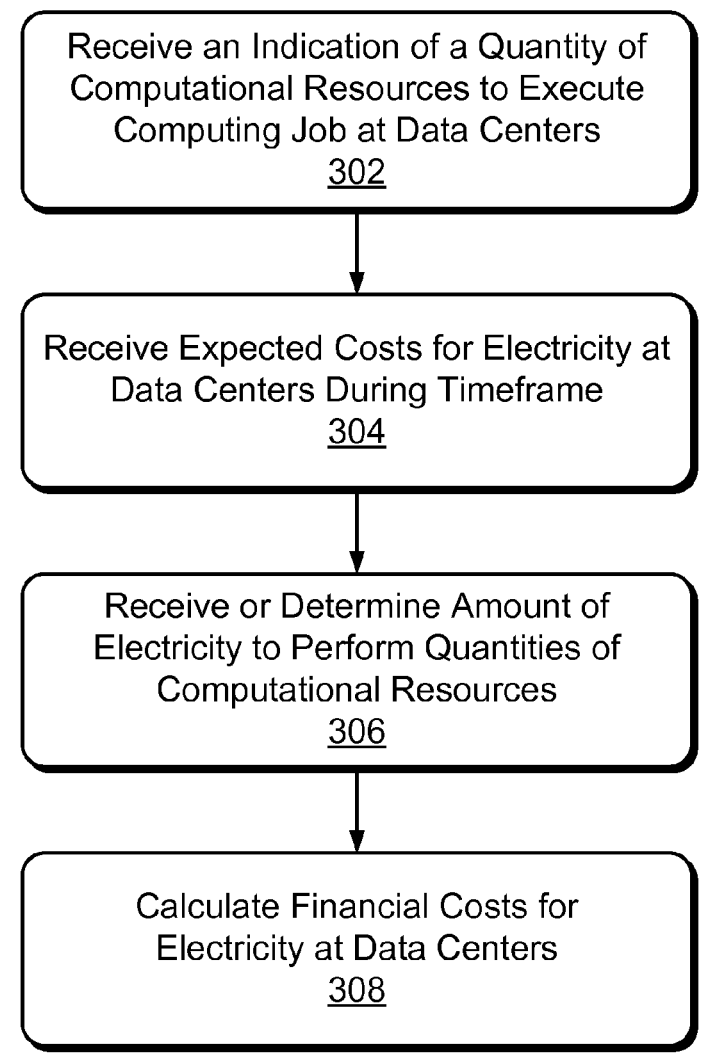
FIG. 3 is a flow diagram depicting example actions to determine cost differences in electricity to perform computing jobs at data centers.

Block 202 may perform a detailed analysis to determine cost differences rather than receive and compare expected costs for electricity. By way of example, consider the case illustrated in FIG. 3, in which blocks 302 to 308 are example actions performed by block 202.

Block 302 receives an indication of a quantity of computational resources needed to execute the computing job at multiple data centers. Each of these computational resources can be associated with a total electrical usage for using that computational resource at that data center, including direct marginal electricity and overhead marginal electricity. The direct marginal electricity includes electricity to operate the resource directly (e.g., to operate the memory and processors of a single computer server). Overhead marginal electricity includes overall or indirect electricity usage attributable to operating a computing resource, such as cooling the data center and the like. Thus, the total electrical usage per computational resource may take into account the data center's total marginal electricity usage in using that computational resource.

Note that the quantity of computational resources needed, such as a number of servers or storage media, may or may not be the same at each data center. One data center may have lower overhead per computational resource (e.g., a more-efficient cooling system for the data center) or lower electricity usage per computational resource (e.g., more-efficient processors).

These indications are received by (or determined at) controlling data center 102. These computational resources are not necessarily the same also due to the data center's resource capacity, in addition to differences noted above. Controlling data center 102 may require more computation resources because it is nearing full capacity, for example. Another data center, however, may not be nearing full capacity, and so require fewer computational resources.

In addition to computational resources potentially being affected by a data center approaching full capacity, there are other electricity factors, many of which are nonlinear. When a data center is nearing full capacity additional marginal electricity may be needed to run cooling systems, backup systems and resources, and other factors.

Figure 4:
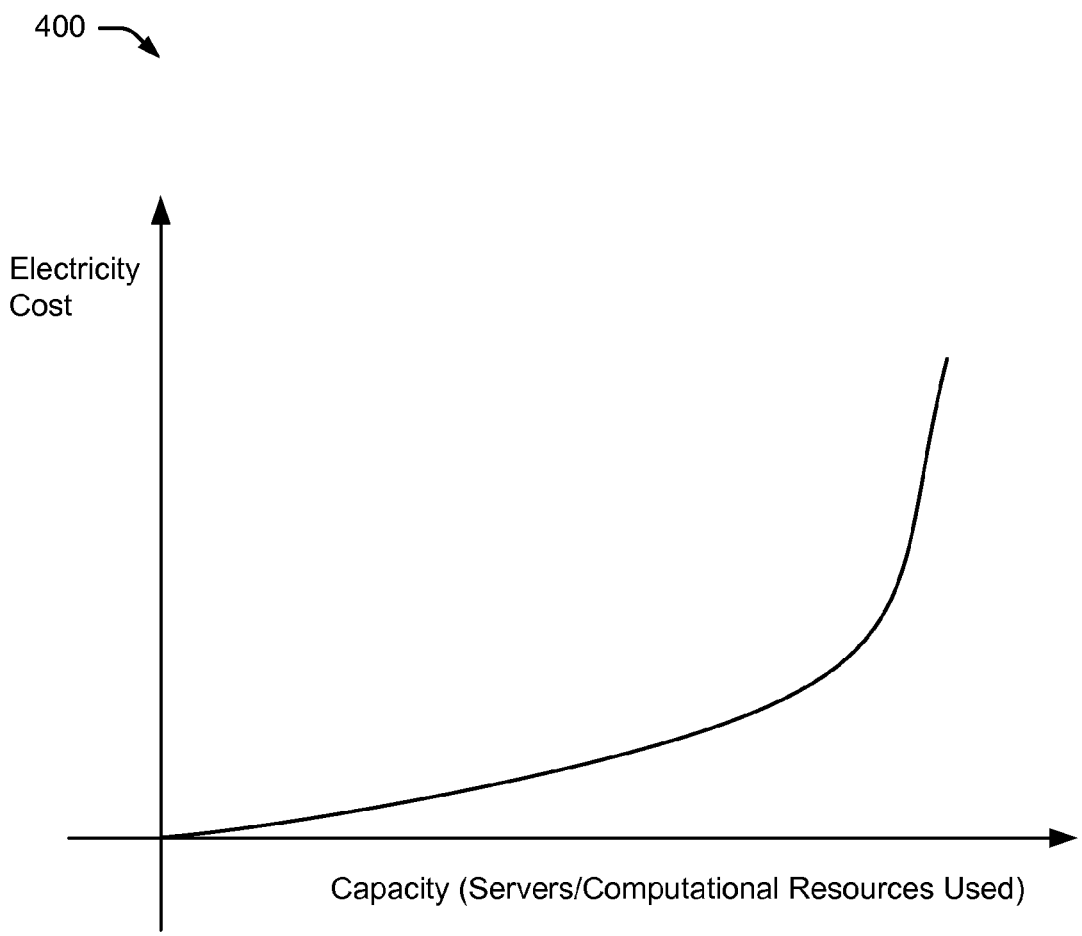
FIG. 4 illustrates an example function relating a data center's electricity cost with its capacity.

Consider chart 400 in FIG. 4, which illustrates one possible electricity-cost-to-data-center-usage relationship. Here the cost of electricity used is nonlinearly related to the computational resources used (expressed as a number of computer servers of total capacity). Note that the electricity costs increase rapidly as computational resources used rises to full capacity. This discussion takes into account varying quantities of computational resources affected by differences in data centers and capacity in those data centers, though not all electricity factors are considered for brevity.

Block 304 receives expected costs for electricity during a timeframe in which the computing job is projected to be executed at the data centers. As will be discussed in more detail below, these costs can vary substantially during a day, even in fifteen-minute increments. Further, other costs may also be incurred and included in the expected costs for electricity, such as taxes (including non-linear tax burdens where taxes increase at greater rates as usage rises) and tax-like liabilities, such as carbon emission fees.

Block 306 determines or receives an amount of electricity needed to perform the quantity of computational resources at each of the data centers. If the quantities of computational resources are the same, these amounts for electricity may also be the same, though that is not required. Some servers in a data center, or the data center generally, may be able to perform computations at lower energy costs. Examples of these are sometimes referred to as "green" computer processors.

Block 308 calculates financial costs for electricity to perform the computing job at the data centers. Thus, assume that job controller 114 received or determined quantities of computational resources, expected costs for electricity, and amounts of electricity to perform the computational resources, all for data centers 102, 104, and 106. To calculate the financial costs for electricity, job controller 114 can simply multiply the expected costs for electricity by the amounts for electricity. Each cost difference is the difference between two of the data centers.

Returning to process 200, block 204 determines costs for bandwidth to communicate the state. Assume that data centers 104 and 106 do not include state 116 but do include application 112. Thus, these other considered data centers are able to perform the computing job once they receive state 116. The costs for bandwidth to transmit the state are based on the time (e.g., the current timeframe) and between which data centers the state will be transferred (102 to 104 or 102 to 106). These bandwidth costs can be retrieved from a published source or provided, such as by a third-party provider. The costs are based on the size of the state, which is generally proportional to the bandwidth needed for transfer. These bandwidth costs are not necessarily one-way, as bandwidth to send state 116 from controlling data center 102 may incur costs, as may receiving state 116 at data center 104 or 106. In some cases, costs for bandwidth to provide results of the computing job are also included in this cost analysis, though this is not required. In such cases, block 204 also determines costs for bandwidth to communicate results from various data centers to the entity that requested the computing job.

Block 206 determines a lowest-cost data center based on costs for bandwidth and cost differences for electricity. In the ongoing example, consider controlling data center 102 located in Houston, data center 104 located in Illinois, and data center 106 located in Florida. In this example assume that bandwidth costs are zero for the Houston data center because it already has state 116, high for the Illinois data center, and low for the Florida data center. Also assume that expected costs for electricity are highest for the Houston data center, lowest for the Illinois data center, and moderate for the Florida data center. Even though the electricity costs are lowest in the Illinois data center, the lower bandwidth costs to send and receive state 116 to the Florida data center may make Florida the lowest-cost data center.

Block 208 places the computing job at the lowest-cost data center. In this example job controller 114 places the computing job at data center 106 located in Florida. As part of this placement, job controller 114 also transmits state 116 to data center 106.

Figure 5:
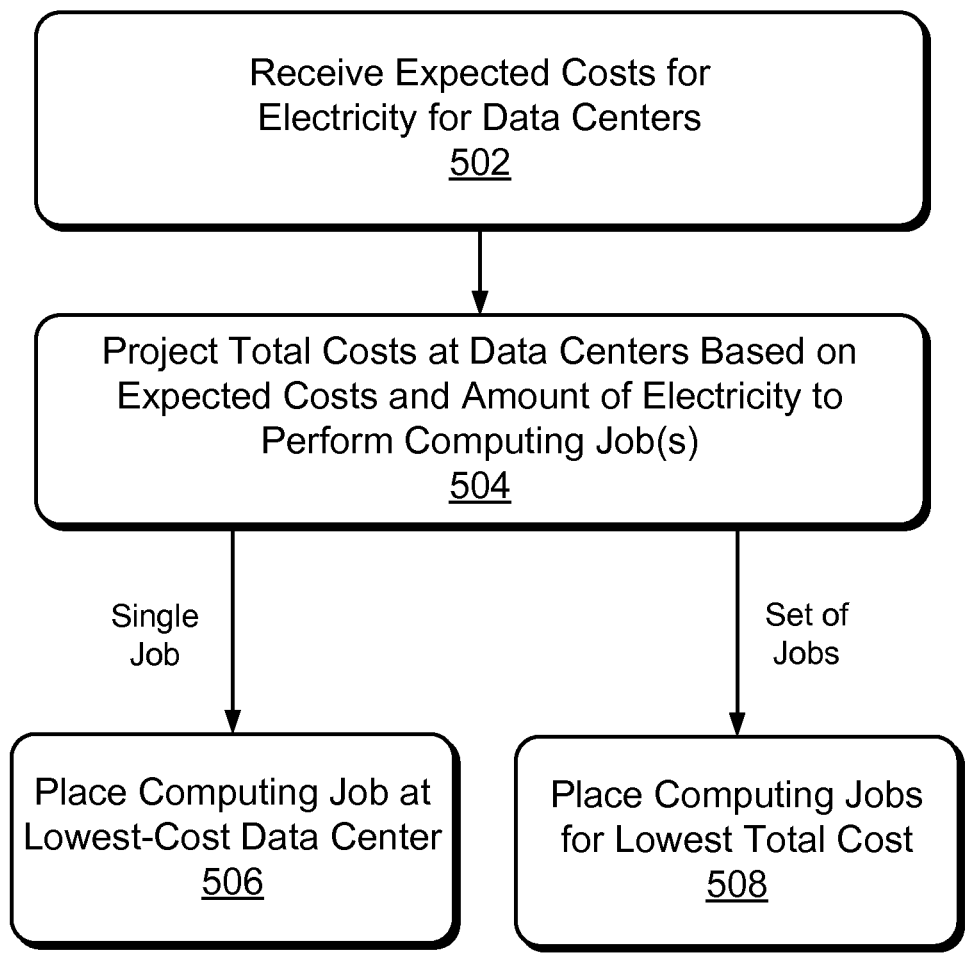
FIG. 5 is flow diagram depicting an example process for dynamically placing a computing job or a set of computing jobs taking into account electricity costs and amounts of electricity to perform the computing job(s).

FIG. 5 is a flow diagram depicting an example process for dynamically placing a computing job or set of computing jobs based on electricity costs.

Block 502 receives expected costs for electricity for multiple data centers. These expected costs are affected by a timeframe in which computing job(s) are projected to be executed, which is often the current timeframe, though a future timeframe may instead be used when the computing jobs are set to be executed during that future timeframe.

Expected costs for electricity are received for multiple data centers, and may include electricity from multiple renewable and non-renewable sources (even for one data center). This expected cost may be best represented by a nonlinear function, though it can be approximated by multiple linear functions.

Figure 6:
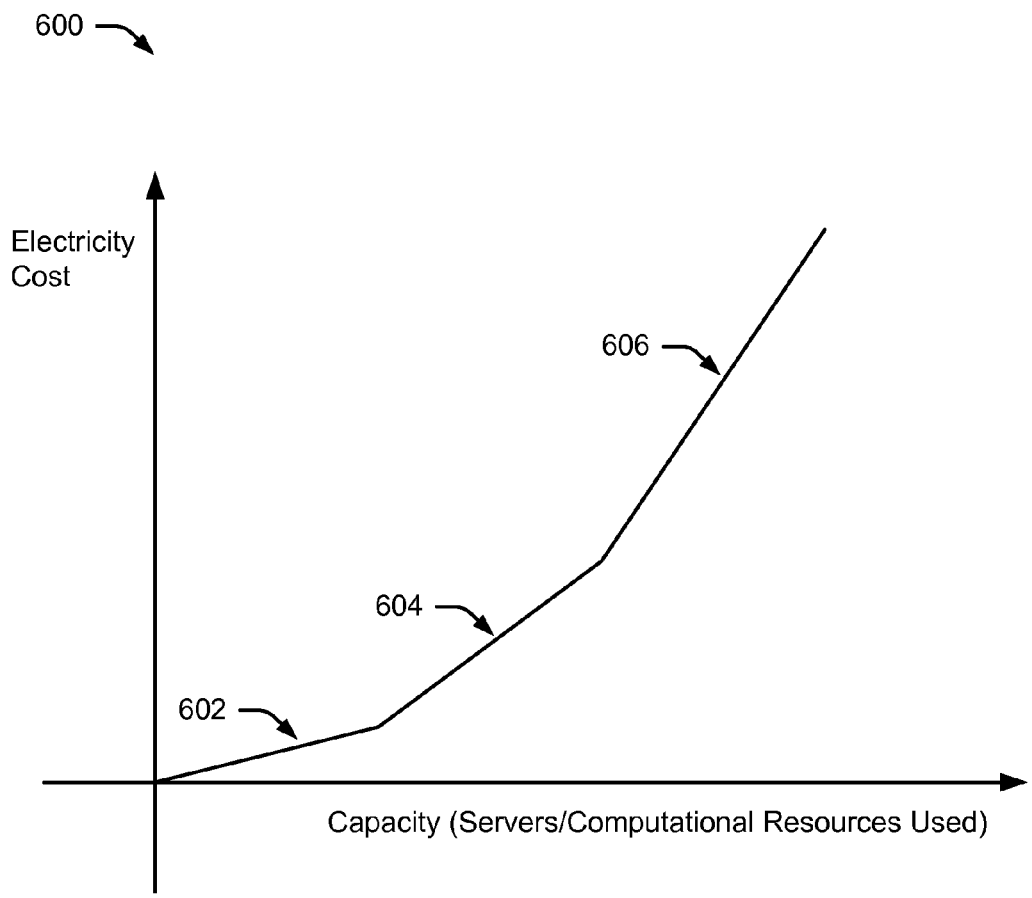
FIG. 6 illustrates an example function relating a data center's electricity cost with its capacity.

Consider, for example, graph 600 of FIG. 6, which shows a function relating electricity cost with capacity of a data center. This function generally varies in time due to the time-varying nature of electricity price and availability. Note that region 602 represents relatively low cost increases, region 604 represents moderate cost increases, and region 606 represents relatively high cost increases.

For this particular example case, assume that this cost-to-usage function represents three distinct energy sources. Thus, one energy source provides electricity at region 602, such as a wind turbine. Region 604 represents electricity sourced from the wind turbine as well as solar panels (or perhaps just solar panels if the wind turbines are fully used). Finally, region 606 represents electricity sourced from the wind turbines and/or the solar panels and also conventional electricity provided from a grid.

Because many sources of renewable energy vary based on weather conditions, times of the day, and other factors, a cost-to-usage function can be difficult to project. To better project the availability of renewably sourced electricity, external factors can be used. Some such external factors include the amount of sunshine the solar panels are likely to receive or how windy it may be during a timeframe in which the computing job is projected to be performed. Thus, the expected cost for electricity to execute a computing job may be lower in Illinois if it is projected to be windy during the timeframe or it may be lower in Florida if it is projected to be sunny. In some cases, therefore, a weather forecast may determine where job controller 114 places a computing job.

Because weather forecasts and many other external factors are not perfect predictors of electricity production, job controller 114 builds a history of how well weather forecasts and other external factors correlate to actual electricity costs. By so doing, job controller 114 can become more and more accurate over time.

In some cases, however, this cost-to-usage function is highly predictable, such as when the electricity is provided by the grid (e.g., a utility company) that guarantees the cost.

Block 504 projects costs at data centers based on expected costs for electricity and amounts of electricity needed to perform the computing job(s). The amount of electricity for each job can be received or determined as noted above and can vary from data center to data center as described elsewhere herein.

As noted above, process 500 can compute a lowest cost for a single computing job or a set of computing jobs. If a single computing job, process 500 proceeds along the "Single Job" path to block 506 to place the computing job at the lowest-cost data center.

If a set of computing jobs, process 500 proceeds along the "Set of Jobs" path to block 508 to place computing jobs of the set for a lowest total cost. For a set of computing jobs, process 500 may perform block 504 for each computing job or for each possible combination of computing jobs at various data centers. In such a case a particular computing job may not be placed at the lowest-cost data center, rather, the set of computing jobs are sent to various data centers for a lowest total cost to perform the set.

Process 500 does not explicitly take bandwidth costs into account, though process 500 and process 200 may be combined in part or whole, whereby the techniques can combine electricity sources, external factors, resource capacity constraints, history of projections, and bandwidth costs to determine a lowest-cost data center. This history of projections can be based on both or either of electricity price and availability, as well as projections of incoming computing jobs and departure of currently running computing jobs.

Consider an example case taking into account renewably sourced electricity and bandwidth costs. Assume for this example that a computing job can be performed at controlling data center 102, in which state 116 already resides, or two other data centers that are available during the projected time frame, here data center 104 and data center 106. Assume that controlling data center 102 will perform the computing job using only conventionally sourced electricity during the projected time frame in which the computing job is to be performed, that data center 104's expected cost for electricity are represented by a function based on conventionally sourced electricity and one renewable energy source, namely wind turbines, and data center 106's expected cost for electricity is represented by a function based on conventionally sourced electricity and two renewable energy sources, solar panels and tide-based generators.

The numerous factors taken into account by the techniques, in this case performed by job controller 114 at controlling data center 102, include, for a projected time frame, resource capacity constraints at data center 102 and data center 106, bandwidth costs to transmit state 116 between data center 102 and data center 104 as well as between data center 102 and data center 106. These factors also include conventionally-sourced electricity costs for all three data centers, projected availability of wind for the wind turbines at data center 104, sunshine for the solar panels at data center 106, and the tides for tide-based generators at data center 106. Others of these factors also include additional electricity that may be needed as any one of the particular data centers approaches high-capacity, such as greater computational resources, additional cooling, and use of backup resources.

Example Implementations and Algorithms

Various implementations and algorithms are described below. For these implementations and algorithms, consider the following model. In this model, a group of data centers are considered from which to compare costs in performing a computing job. This group of data centers is referred to as a "cloud." The cloud includes n data centers, each data center $i \in \{1, \ldots, n\}$ contains a set $\mathcal{H}_i = \{1, \ldots, H_i\}$ of $H_i$ servers, which can be activated simultaneously. This description denotes $H_0 = \Sigma_{i=1}^n H_i$ as the total number of servers in the cloud, and $H_0$ as the capacity of the cloud. Servers in the cloud are assumed to be of equal quality (e.g., in terms of processing power and memory), though they can be heterogeneous.

A basic assumption of this model is that energy costs (and availability) may vary in time, yet remain fixed within time intervals of a fixed length of t (e.g., 15 minutes or one hour). Accordingly, this example considers a discrete time system, where each time-step (or time) $t \in \{1, \ldots, T\}$ represents a different time interval of length t. This example denote $B_t$ as the total job-load at time t measured in server units, namely the total number of servers that need to be active at time t. For simplicity, this example assumes that each computing job requires a single server, thus $B_t$ is also the total number of jobs at time t. Note, however, that the latter assumption can be relaxed as described below, in which case $B_t = B$, namely the job-load in the cloud is fixed. In some other examples noted below, $B_t$ changes in time, which corresponds to job arrivals and departures to/from the cloud, which can also be addressed.

The control decisions in each time t determine which computing jobs to place at which data centers, given the current (and past) energy costs and the bandwidth costs. Before formulating the associated problem, this example describes in detail these different costs.

Energy Costs

This example assumes that the energy cost at every data center is proportional to the number of servers that are being utilized. Let $y_{i,t}$ be the number of servers that are utilized in data center i at time t. The (total) energy cost is given by $C_{i,t}(y_{i,t})$ (measured in dollars per hour). This example assume throughout that $C_{i,t}(y_{i,t})$ is a non-negative, (weakly) convex increasing function. Note that the function itself can change with t, which allows for time variation in energy prices. This example emphasize that there are no probabilistic assumptions on $C_{i,t}(\cdot)$; rather, this function can change arbitrarily over time.

Several cost models are used to motivate the convexity assumption. The simplest example is the linear model, in which the total energy cost is linearly proportional to the number of servers utilized, namely $C_i(y_{i,t}) = c_{i,t} y_{i,t}$, where $c_{i,t}$ is the cost of using a single server at time t. Under a more complex model, the marginal energy cost remains constant while the utilization in the data center is not too high (e.g., around 90 percent). Above some utilization level, the energy cost increases sharply. Practical reasons for such an increase may include the usage of backup resources (processors or energy sources) or enhanced cooling requirements.

The last model has each data center i "connected" to multiple energy sources (e.g., conventional and renewable sources). Under this model, it is plausible to assume that prices will reflect the production cost and availability of each source. More formally, denote by $P_{i,t}^k$ the availability of energy source k at data-center i (measured as the number of servers that can be supported by energy source k), and by $c_{i,t}^k$ the cost of activating a server at data-center i using energy source k. Then up to $P_{i,t}^k$ servers can be utilized at a price of $c_{i,t}^k$ per server. Noting that cheaper energy sources will be always preferred, the total energy cost in readily seen to be a convex increasing function.

Instead of representing the (total) energy cost through the function $C_i(y_{i,t})$, this example considers hereafter the following equivalent cost model. For every time t, the cost of using the j-th server at data center i is given by $c_{i,j,t}$, where $c_{i,j,t} \in (0; \infty)$ is increasing in j ($1 \leq j \leq H_i$). Assume that $c_{i,j,t}$ may change arbitrarily over time (while keeping monotonicity in j as described above). This example allows $c_{i,j,t}$ to be unbounded to account for the case where the total energy availability in the data center is not sufficient to run all of its servers.

Bandwidth Costs

Placing computing jobs at various data centers can induce bandwidth costs, such as in the case where a data center not chosen to perform the computing job includes state information (e.g., state 116 of FIG. 1) while the chosen data center does not (e.g., data center 104 or 106). In practice, bandwidth fees are paid both for outgoing traffic and incoming traffic. Accordingly, assume the following cost model: For every i, denote $d_{i,out}$ as the bandwidth cost of transferring a job out of datacenter i, and by $d_{i,in}$ the bandwidth cost of transferring the job into this data center. Thus, the overall cost of migrating a job from data center i to data center j is given by $d_{i,out}$. Here "migration" is a form of dynamic job placement, the placement from one data center to another, such as 102 to 104 or 106. Note that there are also bandwidth costs associated with arrival of jobs into the cloud (e.g., from a central dispatcher, such as job controller 114 executed at controlling data center 102 in FIG. 1) and leaving the cloud (in case of job departure). However, here we assume that these are constant and do not depend on the migration control, and thus can be ignored.

The sum of the energy costs at the data center and the bandwidth costs of migrating jobs between data centers are a measure of total operational cost in the cloud, which these techniques endeavor to minimize. By leveraging existing process migration techniques, such as incremental check-pointing, it is assumed that the job migration time is negligible with regard to the time interval t in which the energy costs are fixed. This means that migrated jobs at time t incur the energy prices at their new data center, starting from time t.

Note that the above minimization problem is also referred to as a migration problem. If all future energy costs were known in advance, then the problem could optimally solved as a standard Linear Program (LP). However, these techniques assume that energy prices change in an unpredicted manner. Therefore, the dynamical placement problem as an online optimization problem formulated in detail below.

Problem Formulation

This subsection of the description formalizes the migration problem, considering a slightly different version of the original problem, which is algorithmically easier to handle. Nonetheless, the solution of the modified version still leads to performance guarantees for the original problem.

Recall the case of fixed job-load, namely $B_t=B$ for every t. Consider a modification to the migration problem where energy costs remain as in the original migration problem but bandwidth costs do not. In this modified problem, instead of paying $d_{i,out}+d_{j,in}$ for migrating a job from data center i to data center j, the problem pays only for job departures—whenever a job leaves data center i, the incurred bandwidth cost is $d_{i,in}+d_{i,out}$. To simplify notations, henceforth use $d_i \triangleq d_{i,in}+d_{i,out}$.

Solutions for the modified and original migration problems can be summarized in the flowing case. Here the original and modified migration problems are equivalent up to additive constant factors. In particular, a c-competitive algorithm in the modified migration problem results in a c-competitive algorithm for the original migration problem.

Using this case, first formulate a convex program whose solution lower bounds the optimal solution for the (original) migration problem. Let $z_{i,t}$ be the number of jobs that were migrated from data center i at time t. This variable is multiplied by $d_i$ for the respective bandwidth cost. The optimization problem is defined as follows.

$$\min \sum_{i=1}^{n} \sum_{t=1}^{T} d_i z_{i,t} + \sum_{i=1}^{n} \sum_{t=1}^{T} C_{i,t}(y_{i,t}) \quad (1)$$

$$\text{subject to } \forall t: \sum_{i=1}^{n} y_{i,t} \geq B \quad (2)$$

$$\forall i, t: z_{i,t} \geq y_{i,t-1} - y_{i,t} \quad (3)$$

$$\forall i, t: y_{i,t} \leq H_i \quad (4)$$

$$\forall i, t: z_{i,t}, y_{i,t} \in \{0, 1, \ldots, H_i\} \quad (5)$$

Consider a relaxation of constraint (5) above, allowing the variables $z_{i,t}$ and $y_{i,t}$ to receive any value between zero and $H_i$. Namely, this example replaces (5) with the following constraint.

$$\forall i, t: z_{i,t}, y_{i,t} \geq 0. \quad (6)$$

The relaxed problem is, by definition, a lower bound on the original problem. Next, replace the convex program by a Linear Program (LP) for convenience. To this end, define for each data-center i, $y_{i,j,t}$ to be an indicator variable, which is equal to one if the j-th server of data-center i is active at time t, and zero otherwise. Accordingly, the energy cost of using this server at time t is given by $c_{i,j,t} y_{i,j,t}$. This example defines an additional variable $z_{i,j,t}$ to indicate whether a job was migrated from the j-th server of data center i to a different location. This variable is multiplied by $d_i$ for the respective bandwidth cost.

The optimization problem is defined as follows:

$$(P): \min \sum_{i=1}^{n} \sum_{j=1}^{H_i} \sum_{t=1}^{T} d_i z_{i,j,t} + \sum_{i=1}^{n} \sum_{j=1}^{H_i} \sum_{t=1}^{T} c_{i,j,t} \cdot y_{i,j,t} \quad (7)$$

$$\text{subject to } \forall t: \sum_{i=1}^{n} \sum_{j=1}^{H_i} y_{i,j,t} \geq B \quad (8)$$

$$\forall i, j, t: z_{i,j,t} \geq y_{i,j,t-1} - y_{i,j,t} \quad (9)$$

$$\forall i, j, t: y_{i,j,t} \leq 1 \quad (10)$$

$$\forall i, j, t: z_{i,j,t}, y_{i,j,t} \geq 0 \quad (11)$$

Notice that the first term in the objective function corresponds to the total bandwidth cost, whereas the second term corresponds to the total energy cost.

Consider that the above problem formulation might pay the bandwidth cost $d_i$ for migrating data within each data center i, which is not consistent with some above-noted assumptions. Nevertheless, since the energy costs $c_{i,j,t}$ in each data center i are non-decreasing in j for every t, an optimal solution will never prefer servers with higher indexes ("connected" to more expensive energy-sources) over lower-index servers. Consequently, jobs will not be migrated within the data-center. Thus, optimization (P) has the same objective function as the original convex problem. This observation, together with case 1 noted above allows us to consider the optimization problem (P). More formally, for case 2 the value of (P) is a lower bound on the value of the optimal solution to the migration problem. The optimization problem (7) is referred to as the "primal problem." The dual of the primal problem is given by:

$$(D): \max \Sigma_{t=1}^{T} B a_t - \Sigma_{i=1}^{n} \Sigma_{j=1}^{H_i} \Sigma_{t=1}^{T} s_{i,j,t}, \quad (12)$$

$$\forall i,j,t - c_{i,j,t} + a_t + b_{i,j,t} - b_{i,j,t+1} - s_{i,j,t} \leq 0, \quad (13)$$

$$\forall i,j,t \; b_{i,j,t} \leq d_i, \quad (14)$$

$$\forall i,j,t \; b_{i,j,t}, s_{i,j,t} \geq 0. \quad (15)$$

By case 2 and the weak duality theorem noted above, an algorithm that is c-competitive with respect to a feasible solution of (D) would be c-competitive with respect to the offline optimal solution.

Online Job-Migration Algorithm

In this section an online algorithm for the migration problem is designed and analyzed. In the following section the algorithm is presented and shown to be O(log $H_0$)-competitive.

Algorithm Description

This example algorithm is based on a primal-dual approach. This means that at each time t, the new primal variables and the new dual variables are simultaneously updated. The general idea behind the algorithm is to maintain a feasible dual solution to (D), and to upper-bound the operation cost at time t (consisting of bandwidth cost and the energy cost) as a function of the value of (D) at time t. Since a feasible solution to (D) is a lower bound on the optimal solution, this procedure leads to a lower bound on the competitive ratio of the online algorithm.

The online algorithm outputs at any time t is a fractional solution to the variables $y_{i,j,t}$. To obtain the total number of servers that should be activated in data-center i, this example simply calculate the sum $\Sigma_{j=1}^{H_i} y_{i,j,t}$ at every time t. Since this sum is generally a fractional number, it can be rounded to the nearest integer. Because the number of servers in each data-center ($H_i$) is fairly large, the effect of the rounding is negligible and thus ignored here.

The online algorithm receives as input the energy cost vector $\{c_t\}_{i,j}$ at every time t defining the energy cost at each server (i, j) at time t. A well-known reduction allows consideration of elementary cost vectors. Elementary cost vectors are vectors of the form $(0, 0, \ldots, c_{i_t,j_t}, \ldots, 0, 0)$. The reduction allows splitting of a general cost vector into a finite number of elementary cost vectors without changing the value of its optimal solution. Furthermore, the example translates online migration decisions done for these elementary task vectors to online decisions on the original cost vectors without increasing cost. Thus, consider only elementary cost vectors. Use the original time index t to describe these elementary cost vectors. Here use $c_t$ instead of $c_{i_t,j_t}$ to describe the (single) non-zero cost at server ($i_t$, $j_t$) at time t. Thus, the input for this algorithm consists of $i_t$, $j_t$, $c_t$.

This algorithm present updates at each time t the (new) dual variables $a_t$, $s_t$ and $b_{i,j,t+1}$. The values of these variables are determined incrementally, via a continuous update rule. It is not hard to implement the algorithm described by searching for the value $a_t$. However, $a_t$ does not have a closed form. Here refer to the procedure at time t as the t-th iteration.

Each primal variable $y_{i,j,t}$ is continuously updated as well, alongside with the continuous update of the respective dual variable $b_{i_t,j_t,t+1}$. The following relation between $b_{i_t,j_t,t+1}$ and $y_{i,j,t}$ is preserved throughout the iteration:

$$y_{i,j,t} := \frac{1}{H_0}\left(\exp\left(\ln(1+H_0)\frac{b_{i,j,t+1}}{d_i}\right) - 1\right) \quad (16)$$

Each primal variable $y_{i,j,t}$ is continuously updated as well, alongside with the continuous update of the respective dual variable $b_{i_t,j_t,t+1}$. The following relation between $b_{i_t,j_t,t+1}$ and $y_{i,j,t}$ is preserved throughout the iteration:

$$b_{i_t,j_t,t+1} = \frac{d_{i_t}\ln(H_0 y_{i_t,j_t,t} + 1)}{\ln(H_0)}$$

Consider next some inner workings of the algorithm, along with some intuitive insights. The objective in each iteration is to maximize the dual profit. To that end, $a_t$ is increased as much as possible, that is, without violating the primal and dual constraints. The variable $b_{i_t,j_t,t+1}$ decreases throughout the procedure, since $y_{i_t,j_t,t}$ is a function of $b_{i_t,j_t,t+1}$ (via (16)), this example obtain a decrease in the workload on server $j_t$ at data-center $i_t$, while adding workload to other servers. The stopping condition is when either there is no workload left in the costly server, or when the constraint (13) becomes tight for that server. Note that the constraint (13) is not violated for the other servers, as either $b_{i,j,t+1}$ or $s_{i,j,t}$ are increased together with $a_t$. It is preferred to increase $b_{i,j,t+1}$, rather than $s_{i,j,t}$, as an increase to the latter results in a dual-profit loss. Thus, the procedure increases $b_{i,j,t+1}$ as long as its value is below the upper limit $d_i$ (or equivalently, as long as $y_{i,j,t}\leq 1$). If the server reaches its upper limit (in terms of $b_{i,j,t+1}$ or equivalently $y_{i,j,t}$), this example increases $s_{i,j,t}$, which can intuitively be viewed as the so-called price of utilizing the server to its full capacity. Since the number of servers that have reached their full capacity is bounded by B, it is profitable to keep increasing $a_t$ despite the dual-profit loss of increasing $s_{i,j,t}$, as long as no constraint is violated.

In conclusion of this subsection, the discussion focuses on the initialization of the dual variable $b_{i,j,t+1}$, namely $b_{i,j,t+1} = b_{i,j,t}$. As $b_{i,j,t+1}$ is proportional to $y_{i,j,t}$, setting the initial value of $b_{i,j,t+1}$ to be equal to the value of the previous variable suggests that servers that have been fairly utilized continue to be trusted, at least initially. This observation indicates that although the online algorithm is designed to perform well against adversary output, the algorithm puts significant weight on past costs, which are manifested through past utilization. Therefore, the algorithm is expected to work well even when energy prices are more predictable and do not change much between subsequent iterations.

Performance Bound for Online Algorithm

This subsection of the description describes a way in which to obtain a performance bound for the online algorithm, which is summarized in the following theorem, namely that the online algorithm is $O(\log(H_0))$-competitive.

First, this example shows that this online algorithm preserves a feasible primal solution and a feasible dual solution. This example then relates the change in the dual variable $b_{i,j,t+1}$ to the change in the primal variable $y_{i,j,t}$, and the change of the latter to the change in the value of the feasible dual solution. This allows an upper bound to the bandwidth cost at every time t as a function of the change in the value of the dual. Finally, this example finds a proper relation between the bandwidth cost and the energy cost, which allows a bound the latter as a function of the change in the dual value. A detailed proof is provided below.

The first part shows that the primal solution is feasible. Note first that this example keeps the sum of $\Sigma_i \Sigma_j y_{i,j,t}$ equal to B. This equation holds since at each time t this example enforce work conservation through $$\sum_{i,j\neq i_t,j_t} \frac{dy_{i,j,t}}{da_t} = -\frac{dy_{i_t,j_t,t}}{da_t},$$

namely the decrease in the load of server $j_t$ in data-center $i_t$ is equivalent to the increase in the total load at the other servers. Note further that this example keep $y_{i,j,t}\leq 1$ for every for each i, j, t, as $y_{i,j,t}$ is directly proportional to $b_{i,j,t+1}$ via the primal-dual relation (16), and this example stops increasing the latter when $y_{i,j,t}$ reaches one.

The second part shows that the primal solution is feasible. $s_{i,j,t}\geq 0$, as it is initially set to zero and can only increase within the iteration; similarly, $b_{i,j,t+1}\geq 0$ for every i,j$\neq i_t,j_t$. As to $b_{i_t,j_t,t+1}$, it is initially non-negative. As $y_{i_t,j_t,t}\geq 0$ at the end of the iteration, it immediately follows from the primal-dual relation (16) that $b_{i_t,j_t,t+1}\geq 0$ for every t. It also follows from (16) that $b_{i,j,t+1}\leq d_i$, since $b_{i,j,t+1}$ is monotone increasing in $y_{i,j,t}$ (and vice-versa), and $b_{i,j,t+1}=d_i$ if $y_{i,j,t}=1$. It remains to show that the constraint (13) is preserved for every I, j. It is trivially preserved for i,j=$i_t,j_t$, as activating the constraint is a stopping condition for the iteration. For i,j$\neq i_t,j_t$, note that every iteration is initiated with $s_{i,j,t}=0$, $b_{i_t,j_t,t}-b_{i_t,j_t,t+1}=0$ and $a_t=0$ so $-c_t+$ $a_t+b_{i_t,j_t,t}-b_{i_t,j_t,t+1}-s_{i,j,t} \leq 0$, as required. Throughout the iteration, this example increase either $b_{i_t,j_t,t+1}$ or $s_{i,j,t}$ at the same rate that $a_t$ is increased, which insures that the constraint is not violated.

The third part shows that relating the dual and primal variables, and the primal variables to the dual value. Differentiating (16) with respect to $b_{i_t,j_t,t+1}$ leads to the following relation:

$$\frac{dy_{i,j,t}}{db_{i,j,t+1}} = \frac{\ln(1+H_0)}{d_i} \cdot \left(y_{i,j,t} + \frac{1}{H_0}\right). \tag{17}$$

Let $D_t$ denote the increment in the value of the dual solution, obtained by running the online algorithm at iteration t. Noting that $$\frac{ds_{i,j,t}}{da_t} = 1 \text{ for } i, j, t$$

such that $y_{i,j,t}=1$, the derivative of $D_t$ with respect to $a_t$ is given by:

$$\frac{\partial D_t}{\partial a_t} = B - \sum_{i,j \neq i_t,j_t} 1(y_{i,j,t}=1) = y_{i_t,j_t} + \sum_{i,j \neq i_t,j_t | y_{i,j,t}<1} y_{i,j,t}, \tag{18}$$

where $1(\cdot)$ is the indicator function. The last two equations combined allow a relation of the change in the dual variables to the change in the dual value. This example next uses these equations to bound the bandwidth cost.

The fourth part shows bounding of the bandwidth cost. Observe first that if $y_{i_t,j_t,t}$ reaches zero, the iteration terminates, and no further bandwidth cost are charged. Consequently, this example next studies the bandwidth cost while assuming that $y_{i_t,j_t,t}>0$ (if the initial value of this variable is zero there is no bandwidth cost, thus every bound this example obtain below trivially holds for this special case). Since B is an integer, and since $\Sigma_{i,j \neq i_t,j_t} 1(y_{i,j,t}=1)$ is also an integer (not larger than B), it follows from (18) that $(y_{i_t,j_t}\Sigma_{i,j \neq i_t,j_t | y_{i,j}<1} y_{i,j,t})$ is a nonnegative integer; because $y_{i_t,j_t}>0$ the latter integer is strictly positive.

In view of (18), this suggests that:

$$\frac{\partial D_t}{\partial a_t} \geq 1. \tag{19}$$

Now consider an analysis of the derivative of the bandwidth cost with respect to the change in the dual variables $b_{i,j,t+1}$. Instead of considering the actual bandwidth costs, this example pay $d_i$ for moving workload to $i,j \neq i_t,j_t$. This example refers to the latter cost model as the modified bandwidth-cost model. As shown in the first case (case 1 above), the offset in total cost between the original and the modified bandwidth-cost model is constant.

Let $\mathcal{J}_t = \{i,j \neq i_t,j_t | y_{i,j,t}<1\}$. The derivative of the modified bandwidth-cost is given by:

$$\sum_{\mathcal{J}_t} d_i \frac{dy_{i,j,t}}{db_{i,j,t+1}} = \sum_{\mathcal{J}_t} \ln(1+H_0)\left(y_{i,j,t} + \frac{1}{H_0}\right) \tag{20}$$

$$\leq \ln(1+H_0) \cdot \left(1 + \sum_{\mathcal{J}_t} y_{i,j,t}\right) \leq 2\ln(1+H_0)\frac{\partial D}{\partial a_t}, \tag{21}$$

Where (20) follows from (17). Inequality (21) follows by noting that $$\frac{\partial D_t}{\partial a_t} \geq \sum_{\mathcal{J}_t} y_{i,j,t},$$

and from (19). Since the derivative of the modified bandwidth cost is (throughout every iteration t) bounded by $2\ln(1+H_0)$ times the derivative of the dual, it follows by integration that so is the modified bandwidth cost itself. In light of case 1, this example conclude that the original bandwidth cost up to time t is less than $O(\ln(H_0))$ times the dual value up to time t.

The fifth part shows bounding of the energy cost. This part restricts attention to iterations in which $y_{i_t,j_t,t}$ is eventually non-zero and energy cost incurs. If $y_{i_t,j_t,t}=0$ there is no energy cost, and the bound this example obtain below will trivially hold for this case. This analysis would require examination of the evolvement of the variables within the iteration. Therefore, this example henceforth uses the notation x* to denote the value of variable x at the end of the iteration, thereby distinguishing the final values from intermediate ones.

Since $y^*_{i_t,j_t,t}>0$ (at the end of the iteration) the iteration ends with the condition $b_{i_t,j_t,t}-b^*_{i_t,j_t,t+1}=c_t-a^*_t$, which after multiplying both sides by $y^*_{i_t,j_t,t}$ is equivalent to:

$$c_t y^*_{i_t,j_t,t}=(b^*_{i_t,j_t,t}-b^*_{i_t,j_t,t+1})y^*_{i_t,j_t,t}+a^*_t y^*_{i_t,j_t,t}. \tag{22}$$

The left-hand-side of this equation is the energy cost. Note further that the term $a^*_t y^*_{i_t,j_t,t}$ in the righthand-side is bounded by $D_t$ (the increment in the dual value for iteration t). Thus, in order to obtain a bound on the energy cost at time t, it remains to bound the term $(b_{i_t,j_t,t}-b^*_{i_t,j_t,t+1})y^*_{i_t,j_t,t}$ with respect to $D_t$. This term is then bound by considering the bandwidth cost at iteration t. Instead of the true bandwidth cost, this example will assume that the cost for bandwidth is $(y_{i_t,j_t,t-1}-y^*_{i_t,j_t,t})d_{i_t}$, namely this example assumes that the algorithm pays for moving workload outside of $i_t,j_t$. Let $M_t=(y_{i_t,j_t,t-1}-y^*_{i_t,j_t,t})d_{i_t}$. Further:

$$M_t = \int_{\alpha_t=0}^{\alpha_t=a^*_t} d_{i_t} \cdot \frac{dy_{i_t,j_t,t}}{db_{i_t,j_t,t+1}} \frac{dy_{i_t,j_t}}{d\alpha_t} d\alpha_t \tag{23}$$

$$\geq d_{i_t} \cdot (b_{i_t,j_t,t} - b^*_{i_t,j_t,t+1}) \frac{dy_{i_t,j_t,t}}{db_{i_t,j_t,t+1}}(b^*_{i_t,j_t,t+1}) \tag{24}$$

$$= \ln(1+H_0)(b_{i_t,j_t,t}-b^*_{i_t,j_t,t+1})\left(y^*_{i_t,j_t,t}+\frac{1}{H_0}\right), \tag{25}$$

where $\frac{dy_{i_t,j_t,t}}{db_{i_t,j_t,t+1}}(b^*_{i_t,j_t,t+1})$ is the derivative of $y_{i_t,j_t,t}$ with respect to $b_{i_t,j_t,t+1}$, evaluated at the end of the iteration (where $b_{i_t,j_t,t+1}=b^*_{i_t,j_t,t+1}$ and $y_{i_t,j_t,t}=y^*_{i_t,j_t,t}$). Equation (23) follows by integrating the movement cost from $i_t,j_t$ while increasing $a_t$ from zero to its final value $a^*_t$. Inequality (24) is justified as follows. In view of (17), the smallest value of the derivative $$\frac{dy_{i_t,j_t,t}}{db_{i_t,j_t,t+1}}$$

within an iteration is when $y_{i_t,j_t,t}$ is the smallest. Since $y_{i_t,j_t,t}$ monotonously decreases within the iteration, this example take the final value of the derivative and multiply it by the total change in the dual variable $b_{i_t,j_t,t+1}$, given by $(b_{i_t,j_t,t}-b^*_{i_t,j_t,t+1})$.

Plugging (17) leads to (25). Using the above inequality, this example may bound the required term:

$$(b_{i_t,j_t,t} - b^*_{i_t,j_t,t+1})y^*_{i_t,j_t,t} \leq M_t \frac{y^*_{i_t,j_t,t}}{\ln(1+H_0)\left(y^*_{i_t,j_t} + \frac{1}{H_0}\right)} \leq M_t \frac{y^*_{i_t,j_t,t}}{\ln(1+H_0)}$$

Substituting this bound in (22) yields:

$$c_t y^*_{i_t,j_t,t} \leq \frac{M_t}{\ln(1+H_0)} + a^*_t y^*_{i_t,j_t,t}. \quad (26)$$

Recall that the actual bandwidth cost is only a constant factor away from $\Sigma_t M_t$ (see case 1 above). Summing (26) over t and reusing (21) indicates that the total energy cost is at most three times the dual value (plus a constant), namely $O(1)$ times the dual value.

Combining parts 4 and 5, this example conclude that the above online algorithm is $O(\log (H_0))$-competitive. The above also shows that the online algorithm is expected to be robust against any possible deviation in energy prices. However, its complexity is sometimes too high for an efficient implementation with an adequate level of precision: First, the reduction of (11) generally splits each cost vector at any given time t into $O(H_0^2)$ vectors, thereby requiring a large number of iterations per each actual time step t. Second, the need for proper discretizeation of the continuous update rule of the dual variables, which might make each of the iterations computationally costly. This example therefore suggests, in the next section, an easier-to-implement online algorithm, which inherits the main ideas of the above, original algorithm, yet decreases significantly the running complexity per time step.

Efficient Online Algorithm

For illustration, an efficient online algorithm is described that employs from the original online algorithm several ideas and mathematical relations. The algorithm can accordingly be viewed as an efficient variant of the original online algorithm, thus would be henceforth referred to as the efficient online algorithm. While this example does not provide theoretical guarantees for the performance of the efficient online algorithm, this example has been demonstrated, through real-data simulations, to have superiority over plausible greedy heuristics. The efficient online algorithm provides a complete algorithmic solution, which also includes the allocation of newly arrived computing jobs.

For simplicity, this example describes the efficient online algorithm for linear electricity prices (e.g., the electricity price for every data center i and time t is $c_{i,t}$, regardless of the number of servers that are utilized). The input for the algorithm at every time t is thus an n dimensional vector of prices, $c_t = c_{1,t}, c_{2,t}, \ldots, c_{n,t}$. With some abuse of notations, this example re-enumerate the datacenters in each iteration according to the present electricity prices, so that $c_1 \leq c_2 \leq \ldots \leq c_n$. For exposition purposes this example omits the time index t from all variables (e.g., this example write $c = (c_1, c_2, \ldots, c_n)$ instead of $c_t = c_{1,t}, c_{2,t}, \ldots, c_{n,t}$). This example denotes by $d_{i,k} = d_{i,out} + d_{k,in}$ the bandwidth cost per unit for transferring load from data center i to data center k; this example further denote by $c_{i,k}$ the difference in electricity prices between the two data centers, namely $c_{i,k} = c_i - c_k$.

Before elaborating on the logic behind the efficient online algorithm, this example note that the running complexity of each iteration is $O(n^2)$. Note that the inner loop makes sure that data is migrated from the currently expensive data-centers to cheaper ones (in terms of the corresponding electricity prices). This example comments that a fairly simple migration rule could be implemented in a distributed manner, where data centers exchange information on their current load and electricity price.

The rationale behind the efficient online algorithm, and in particular the relation between the migration rule and the original online algorithm, are described earlier. This example first motivates the use of the term $c_{i,k}y_i$ in the migration rule. Observe from (26) that the energy cost at each iteration is proportional to the migration cost at the same iteration. The reason that this example uses $c_{i,k} = c_i - c_k$, which is the marginal additional energy cost is related to the reduction from general cost vectors to elementary cost vectors that are non-zero in only single coordinate (11).

The reduction creates elementary cost vectors by first taking the smallest cost $c_1$ and dividing it to such vectors, which are spread in small pieces into all data centers. The second to be spread is $c_2 - c_1$, which is used for creating cost vectors for all data centers but the first one (whose entire cost has already been covered at the previous step). This allocation proceeds iteratively until spreading the last cost of $c_n - c_{n-1}$. Since the inputs which are used for the original online algorithm are created by using the marginal additional costs, $c_{i,k}$, it is natural to use this measure for determining the job migration policy. Finally, the term $c_{i,k}y_i$ corresponds to the marginal energy this example could save by migrating all jobs in data center i to data center k.

Further examination of the migration rule reveals that the amount of work that is migrated from data center i to data center k is proportional to $y_k$ (the load at the target data center). The motivation for incorporating $y_k$ in the migration rule follows directly from (17), which suggests that the change in the load in data center k should be proportional to the current load, $y_k$. As discussed earlier, this feature essentially encourages the migration of jobs into data centers that were cheap in the past, and consequently loaded in the present. Another idea that appears in (17) and is incorporated in the current migration rule is that the migrated workload is inversely proportional to the bandwidth cost; this example use here the actual per-unit bandwidth cost from data center i to data center k, given by $d_{i,k} = d_{i,out} + d_{k,in}$. Taking $d_{i,k}$ into account prevents job migration between data centers with high bandwidth cost.

The last idea, which is borrowed from (17) and incorporated in the migration rule, is to include an additive term $s_2$, which reduces the effect of $y_k$. This additive term enables the migration of jobs to data centers, even if they are currently empty. The value of $s_2$ could, in principle, be adjusted throughout the execution of the algorithm. Intuitively, the value of $s_2$ manifests the natural tradeoff between making decisions according to current energy prices (high $s_2$) or relaying more on usage history (low $s_2$). The other parameter in the migration rule, $s_1$, sets the aggressiveness of the algorithm. Increasing $s_1$ makes the algorithm greedier in exploiting the currently cheaper electricity prices (even at the expense of high bandwidth costs). This parameter can be optimized as well (either offline or online) to yield the best performance.

To complete the description of the efficient online algorithm, this example next specifies how newly arrived traffic is distributed. This example makes the simplifying assumption that jobs arrive to a single global dispatcher, and then allocated to the different data-centers. The case of multiple dispatchers is considered briefly, nonetheless algorithms for this case can be deduced from the rule described below. A newly arrived job is assigned through the following probabilistic rule: At every time t, assign the job to data center i with probability proportional to:

$$\frac{1}{d_i}(y_i + s_2)(\text{where } d_i = d_{i,in} + d_{i,out}).$$

The reasoning behind this rule is the same as elaborated above for the migration rule. This example section concludes by outlining how the efficient online algorithm can handle non-linear pricing for electricity. Consider a data center that is supported by l energy sources. At any time each source has energy cost $c_t$ and availability $P_t$ (i.e., $P_t$ is the number of servers that this example can support using this energy source). The idea is to treat each energy source as a virtual data center. For each data center i this example takes the cheapest energy sources whose total availability is $H_i$ (truncating the availability of the last energy source used). The current load of the data center on the energy sources is then partitioned, preferring cheaper energy sources. Finally, this example treats each such energy source as a virtual data center (with capacity $P_t$ and cost $c_t$) simulating migration between different energy sources of different data centers.

Conclusion

This document describes techniques for dynamically placing computing jobs. These techniques enable reduced financial and/or energy costs to perform computing jobs at data centers. These techniques do so by dynamically placing a computing job at one of various data centers based on marginal electricity usage, expected costs for electricity including those for conventionally sourced and renewably-sourced electricity, resource capacity constraints, or bandwidth costs to transfer state information needed to perform the computing job. Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computer processing devices, the method comprising:

determining cost differences for electricity to perform a computing job at an individual data center having state information usable to perform the computing job and multiple remotely-located data centers, wherein the multiple remotely-located data centers are at different geographic locations than the individual data center and include at least:

a first remotely-located data center that does not have the state information, and a second remotely-located data center that also does not have the state information;

determining multiple costs for bandwidth to communicate the state information from the individual data center to the multiple remotely-located data centers, wherein a first cost for bandwidth to communicate the state information to the first remotely-located data center of the multiple data centers is different than a second cost for bandwidth to communicate the state information to the second remotely-located data center;

determining further costs for bandwidth to communicate results of the computing job from the individual data center and the multiple remotely-located data centers to an entity that requested the computing job;

identifying, from the individual data center and the multiple remotely-located data centers, a selected data center to perform the computing job, wherein the selected data center is identified based on the cost differences for electricity, the multiple costs for bandwidth, and further costs for bandwidth; and placing the computing job at the selected data center, wherein the determining the cost differences comprises calculating:

an individual expected electricity cost of performing the computing job using individual computational resources of the individual data center, and multiple other expected electricity costs of performing the computing job using other computational resources of the multiple remotely-located data centers.

2. The method as recited in claim 1, further comprising:

prior to the determining the cost differences for electricity, receiving indications that the multiple remotely-located data centers are available to perform the computing job.

3. The method as recited in claim 1, wherein the determining the cost differences for electricity further comprises:

obtaining an indication of quantities of the individual computational resources that would be used to execute the computing job provided the computing job is placed at the individual data center;

obtaining other indications of other quantities of the other computational resources that would be used to execute the computing job provided the computing job is placed at the multiple remotely-located data centers, respectively;

obtaining an individual amount of electricity to perform the computing job using the quantities of the individual computational resources at the individual data center; and obtaining other amounts of electricity to perform the computing job using the other quantities of the other computational resources at the multiple remotely-located data centers.

4. The method as recited in claim 1, wherein the determining the individual expected electricity cost is based on multiple energy sources available at the individual data center, at least one of the multiple energy sources being a renewable energy source.

5. The method as recited in claim 4, further comprising:

determining the individual expected electricity cost based on a projection of an availability of electricity from the renewable energy source at the individual data center when the computing job is performed.

6. The method as recited in claim 1, wherein the determining the cost differences for electricity is based on associated geographic locations of the individual data center and the multiple remotely-located data centers, respectively, the associated geographic locations affecting electricity costs at the individual data center and the multiple remotely-located data centers.

7. A system comprising:

one or more processing devices; and one or more computer-readable memory devices storing program code that, when executed by the one or more processing devices, cause the one or more processing devices to:

determine a first electricity cost for electricity to perform a computing job using first computational resources of a first remotely-located data center, wherein the computing job has associated state information usable to perform the computing job, determine a second electricity cost for electricity to perform the computing job using second computational resources of a second remotely-located data center, determine a first bandwidth cost to communicate the associated state information to the first remotely-located data center and a second bandwidth cost to communicate the associated state information to the second remotely-located data center, determine an individual data center from the first data center and the second data center for placement of the computing job, wherein the individual data center is determined based on the first electricity cost, the second electricity cost, the first bandwidth cost to communicate the associated state information to the first data center, and the second bandwidth cost to communicate the associated state information to the second remotely-located data center, and place the computing job at the individual data center.

8. The system according to claim 7, wherein the individual data center is the lowest cost data center of the first data center and the second data center.

9. The system according to claim 7, wherein the computational resources of the first data center include multiple first servers and the computational resources of the second data center include multiple second servers.

10. The system according to claim 9, wherein the first data center and the second data center include different numbers of servers.

11. The system according to claim 7, wherein the first electricity cost is determined using a convex increasing function to represent a relationship between the first electricity cost and a number of the first computational resources used for the computing job.

12. One or more computer-readable memory devices storing program code which, when executed by one or more processing devices, causes the one or more processing devices to perform acts comprising:

determining a first electricity cost for electricity to perform a computing job locally using first computational resources of a first data center having state information for the computing job, wherein the state information is usable to perform the computing job;

determining a second electricity cost for electricity to perform the computing job using second computational resources of a second remotely-located data center that does not have the state information for the computing job;

determining a third electricity cost for electricity to perform the computing job using third computational resources of a third remotely-located data center that does not have the state information for the computing job;

determining a first bandwidth cost to communicate the state information from the first data center to the second remotely-located data center;

determining a second bandwidth cost to communicate the state information from the first data center to the third remotely-located data center, wherein the second bandwidth cost is different than the first bandwidth cost; and identifying a selected data center from the first data center, the second remotely-located data center, and the third remotely-located data center for placement of the computing job, wherein the selecting considers:

the first electricity cost,
the second electricity cost,
the third electricity cost,
the first bandwidth cost, and
the second bandwidth cost.

13. The one or more computer-readable memory devices according to claim 12, the acts further comprising:

placing the computing job at the selected data center.

14. The one or more computer-readable memory devices according to claim 12, the acts further comprising:

in an instance when the second remotely-located data center is the selected data center, causing the first data center to send the state to the second remotely-located data center and not send the state to the third remotely-located data center.

15. The one or more computer-readable memory devices according to claim 12, wherein the first data center, the second remotely-located data center, and the third remotely-located data center each host different instances of an application configured to perform the computing job.

16. The one or more computer-readable memory devices according to claim 12, wherein the first electricity cost reflects both direct electricity costs and marginal electricity costs of operating the first computational resources.

17. The one or more computer-readable memory devices according to claim 12, wherein the determining the first electricity cost comprises modeling the first electricity cost based on a convex increasing function.

18. The one or more computer-readable memory devices according to claim 12, wherein the first electrical cost, the second electrical cost, and the third electrical cost each reflect different financial costs.

19. The one or more computer-readable memory devices according to claim 12, wherein the second electricity cost reflects an expected cost of a renewable energy resource at the second remotely-located data center based on projected weather conditions at the second remotely-located data center.

20. The one or more computer-readable memory devices of claim 12, wherein the first electricity cost and the second electricity cost are both determined using a function that accounts for both electricity sourced from at least one power grid and electricity sourced from at least one renewable energy source.

* * * * *